United States Patent
Kim et al.

(10) Patent No.: US 10,656,742 B2
(45) Date of Patent: May 19, 2020

(54) TOUCH SENSOR AND DISPLAY DEVICE HAVING THE TOUCH SENSOR

(71) Applicant: Samsung Display Co., Ltd., Yongin-si (KR)

(72) Inventors: Do Ik Kim, Yongin-si (KR); Sang Hyun Lim, Yongin-si (KR); Ga Young Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/841,214

(22) Filed: Dec. 13, 2017

(65) Prior Publication Data

US 2018/0224984 A1    Aug. 9, 2018

(30) Foreign Application Priority Data

Feb. 3, 2017    (KR) .......................... 10-2017-0015799

(51) Int. Cl.
  *G06F 3/041* (2006.01)
  *G06F 3/044* (2006.01)

(52) U.S. Cl.
  CPC ............ *G06F 3/0412* (2013.01); *G06F 3/044* (2013.01); *G06F 3/0418* (2013.01); *G06F 2203/04103* (2013.01); *G06F 2203/04111* (2013.01)

(58) Field of Classification Search
  None
  See application file for complete search history.

(56) References Cited

U.S. PATENT DOCUMENTS 5,159,159 A * 10/1992 Asher .................... G01L 1/205
                                                    178/18.05
5,861,875 A *  1/1999 Gerpheide ............. G06F 3/041
                                                    178/18.06

(Continued)

FOREIGN PATENT DOCUMENTS

CN    104205025    12/2014
CN    104428741     3/2015

(Continued)

OTHER PUBLICATIONS

Non-Final Office Action dated May 13, 2019, issued in the U.S. Appl. No. 15/978,355.

(Continued)

*Primary Examiner* — Chad M Dicke
(74) *Attorney, Agent, or Firm* — H.C. Park & Associates, PLC

(57) ABSTRACT

A touch sensor including a substrate including an active area and a non-active area, a plurality of first electrodes extending in first direction on the active area, a plurality of second electrodes extending in a second direction crossing the first direction on the active area, a plurality of third electrodes including electrode portions disposed in the first electrodes, respectively, being separated from the first electrodes, and extending in the first direction on the active area, and a sensing circuit including a plurality of signal receivers receiving sensing signals from the first electrodes, respectively, in which each of the signal receivers includes first and second input terminals connected to a pair of first and third electrodes corresponding to each other, respectively, and outputs a signal corresponding to a voltage difference between the first and second input terminals.

19 Claims, 17 Drawing Sheets

(56) References Cited

U.S. PATENT DOCUMENTS

| | | | |
|---|---|---|---|
| 7,880,479 B2 | 2/2011 | Liao et al. | |
| 8,269,743 B2 | 9/2012 | Kuo et al. | |
| 8,711,120 B2* | 4/2014 | Hargreaves | G06F 3/045 178/18.08 |
| 9,182,432 B2* | 11/2015 | Shahrokhi | G01R 27/2605 |
| 9,195,271 B2 | 11/2015 | Kang et al. | |
| 9,244,573 B2 | 1/2016 | Ryu et al. | |
| 9,377,905 B1 | 6/2016 | Grivna et al. | |
| 9,632,643 B2 | 4/2017 | Cho et al. | |
| 9,671,909 B2* | 6/2017 | Xu | G06F 3/044 |
| 9,817,532 B2* | 11/2017 | Zhang | G06F 3/044 |
| 9,841,834 B2* | 12/2017 | Xie | G02F 1/133345 |
| 9,927,939 B2* | 3/2018 | Na | G06F 3/044 |
| 9,965,108 B2* | 5/2018 | Li | G06F 3/044 |
| 10,001,870 B2* | 6/2018 | Li | G06F 3/044 |
| 10,001,877 B2* | 6/2018 | Noto | G06F 1/3218 |
| 2007/0058438 A1* | 3/2007 | Saito | G11C 7/067 365/185.23 |
| 2009/0213090 A1* | 8/2009 | Mamba | G06F 3/044 345/174 |
| 2010/0045614 A1* | 2/2010 | Gray | G06F 3/044 345/173 |
| 2010/0220075 A1 | 9/2010 | Kuo et al. | |
| 2010/0245269 A1 | 9/2010 | Jeong et al. | |
| 2011/0007030 A1* | 1/2011 | Mo | G06F 3/044 345/174 |
| 2011/0084929 A1* | 4/2011 | Chang | G06F 3/0416 345/173 |
| 2011/0187676 A1 | 8/2011 | Chang et al. | |
| 2011/0234509 A1 | 9/2011 | Lee et al. | |
| 2011/0242058 A1 | 10/2011 | Lee et al. | |
| 2011/0310033 A1* | 12/2011 | Liu | G06F 3/0412 345/173 |
| 2012/0056820 A1 | 3/2012 | Corbridge | |
| 2012/0169651 A1* | 7/2012 | Chang | G06F 3/0418 345/174 |
| 2012/0169655 A1 | 7/2012 | Chang | |
| 2012/0169656 A1 | 7/2012 | Chang | |
| 2013/0106752 A1* | 5/2013 | Lin | G06F 3/044 345/173 |
| 2013/0154996 A1* | 6/2013 | Trend | G06F 3/044 345/174 |
| 2013/0194213 A1 | 8/2013 | Chou et al. | |
| 2013/0241845 A1 | 9/2013 | Hsu et al. | |
| 2013/0257785 A1* | 10/2013 | Brown | G06F 3/044 345/174 |
| 2013/0257786 A1 | 10/2013 | Brown et al. | |
| 2013/0335365 A1* | 12/2013 | Kim | G06F 3/044 345/174 |
| 2014/0009428 A1* | 1/2014 | Coulson | G06F 3/044 345/174 |
| 2014/0015796 A1 | 1/2014 | Philipp | |
| 2014/0062951 A1* | 3/2014 | Chang | G06F 3/044 345/174 |
| 2014/0111707 A1* | 4/2014 | Song | G06F 3/044 349/12 |
| 2014/0253499 A1* | 9/2014 | Lee | G06F 3/044 345/174 |
| 2015/0075959 A1* | 3/2015 | Lu | G06F 3/0416 200/5 R |
| 2015/0145802 A1 | 5/2015 | Yao et al. | |
| 2015/0179122 A1* | 6/2015 | Brown | G06F 3/0416 345/174 |
| 2015/0287381 A1* | 10/2015 | Kim | G06F 3/044 345/174 |
| 2016/0169656 A1 | 6/2016 | Padovani et al. | |
| 2016/0188082 A1* | 6/2016 | Ham | G06F 3/0416 345/174 |
| 2016/0342265 A1* | 11/2016 | Geaghan | G06F 3/0416 |
| 2017/0091508 A1* | 3/2017 | Han | G06F 3/041 |
| 2018/0004317 A1* | 1/2018 | Bohannon | G06F 3/041 |
| 2018/0059869 A1* | 3/2018 | Ma | G06F 3/0412 |
| 2018/0088708 A1* | 3/2018 | Naganuma | G06F 3/0412 |
| 2018/0129352 A1 | 5/2018 | Kim et al. | |
| 2018/0136761 A1* | 5/2018 | Jiang | G06F 3/0414 |
| 2018/0157355 A1* | 6/2018 | Kim | G06F 3/0412 |
| 2018/0188887 A1 | 7/2018 | Anno | |
| 2018/0224984 A1 | 8/2018 | Kim et al. | |
| 2018/0300012 A1* | 10/2018 | Lu | G06F 3/0416 |
| 2018/0321793 A1 | 11/2018 | Kim et al. | |
| 2018/0329555 A1 | 11/2018 | Kim et al. | |
| 2018/0329576 A1 | 11/2018 | Kim et al. | |
| 2019/0102017 A1 | 4/2019 | Kim et al. | |
| 2019/0235678 A1 | 8/2019 | Kim et al. | |

FOREIGN PATENT DOCUMENTS

| | | |
|---|---|---|
| EP | 0 833 931 | 12/1998 |
| JP | 5154316 | 2/2013 |
| KR | 10-2010-0095886 | 9/2010 |
| KR | 10-2012-0133474 | 12/2012 |
| KR | 10-2014-0053628 | 5/2014 |
| KR | 10-2015-0117622 | 10/2015 |
| KR | 10-2016-0020987 | 2/2016 |
| KR | 10-1620463 | 5/2016 |
| KR | 10-2016-0099791 | 8/2016 |
| KR | 10-2016-0119294 | 10/2016 |
| KR | 10-2018-0064625 | 6/2018 |
| KR | 10-2018-0074880 | 7/2018 |
| KR | 10-2018-0090936 | 8/2018 |
| KR | 10-2018-0122761 | 11/2018 |
| KR | 10-2018-0125671 | 11/2018 |
| KR | 10-2018-0125672 | 11/2018 |
| KR | 10-2019-0093236 | 8/2019 |

OTHER PUBLICATIONS

Office Action dated Jun. 14, 2019, issued in Chinese Patent Application No. 201810455871.0.

Final Office Action dated Aug. 28, 2019, issued in U.S. Appl. No. 15/978,355.

Search Report dated May 8, 2018, in Korean Patent Application No. 10-2017-0060138.

Office Action dated Aug. 14, 2018, in Korean Patent Application No. 10-2017-0060138.

Search Report dated Sep. 7, 2018, issued in Korean Patent Application No. 10-2018-0102228.

Extended European Search Report dated Oct. 26, 2018, in European Patent Application No. 18172474.1.

Decision to Grant a Patent dated Nov. 16, 2018, in Korean Patent Application No. 10-2017-0060138.

Chinese Office Action dated Dec. 2, 2019, issued in Chinese Patent Application No. 201810455871.

Non-Final Office Action dated Dec. 11, 2019, in U.S. Appl. No. 15/978,355.

Non-Final Office Action dated May 14, 2018, in U.S. Appl. No. 15/978,355.

Notice of Allowance dated Mar. 25, 2020 in corresponding U.S. Appl. No. 15/978,355.

* cited by examiner

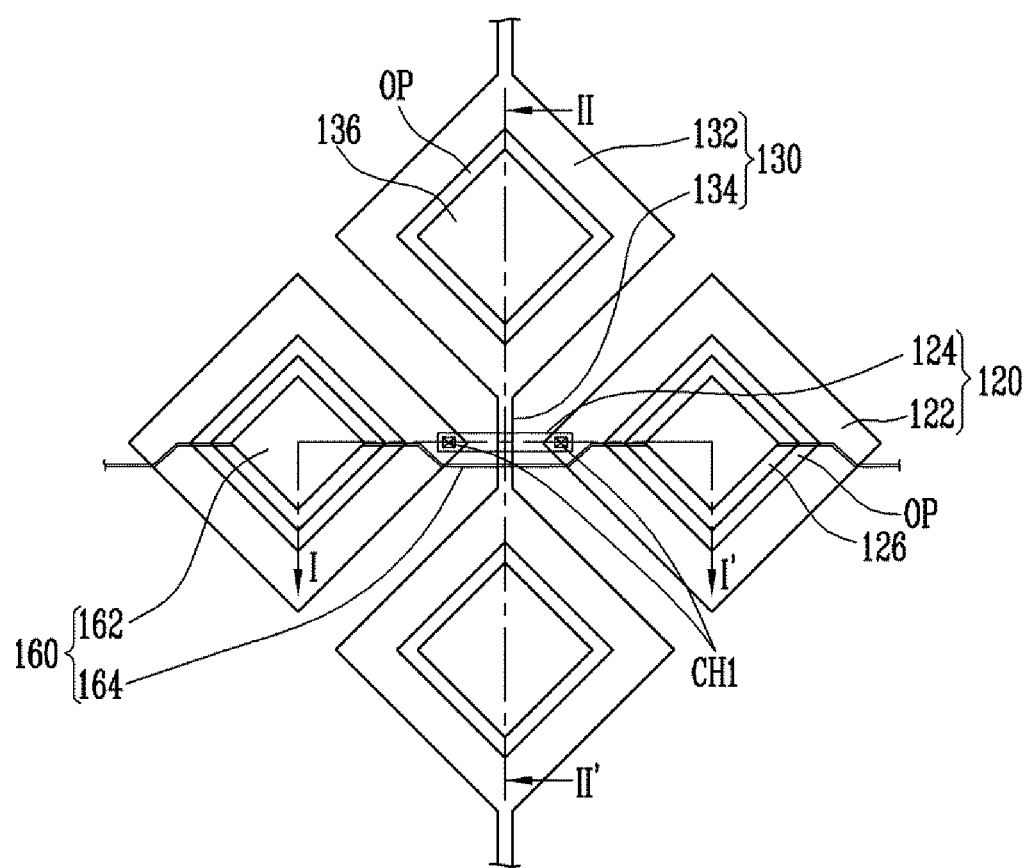

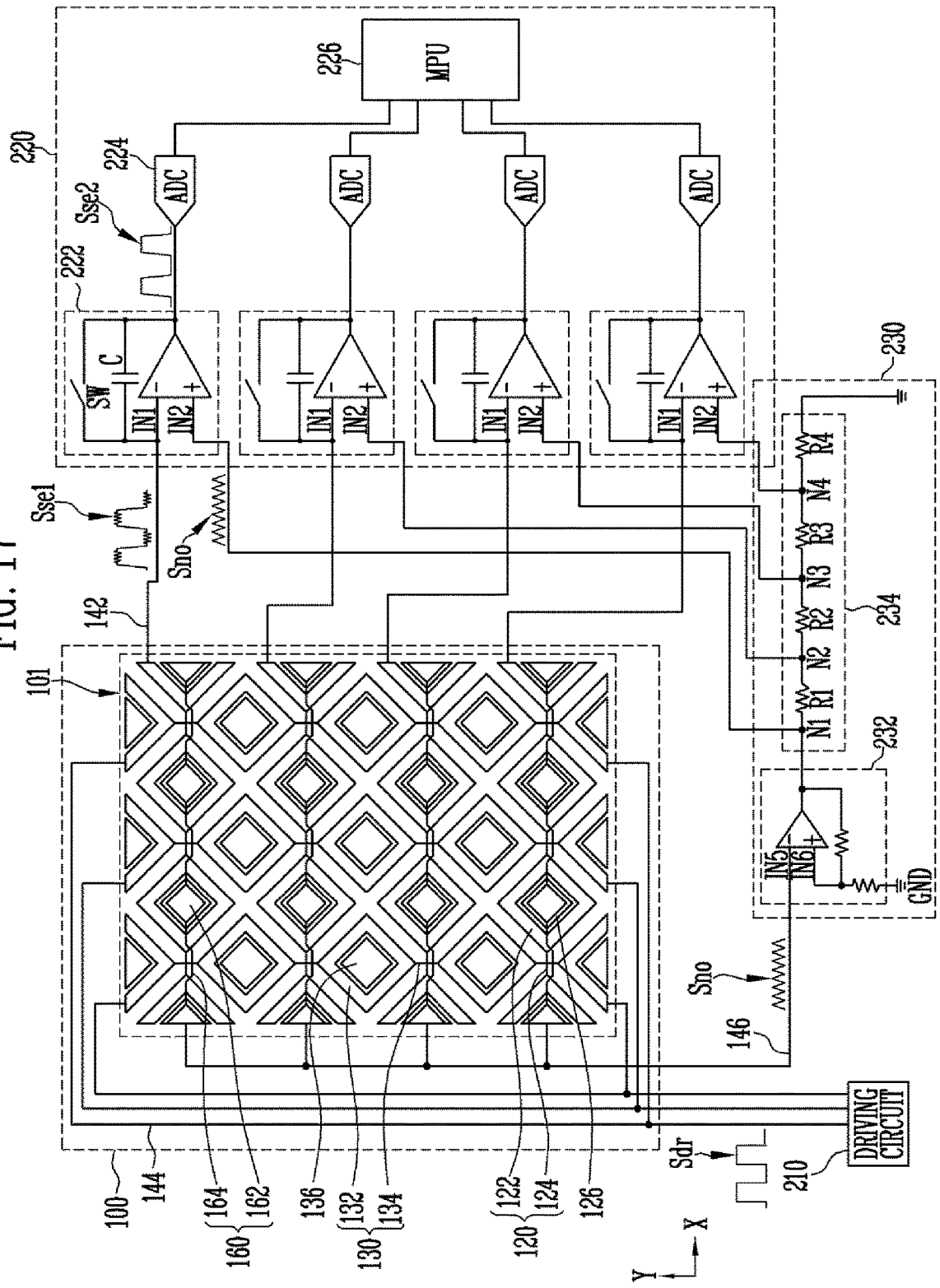

TOUCH SENSOR AND DISPLAY DEVICE HAVING THE TOUCH SENSOR

CROSS-REFERENCE TO RELATED APPLICATION

This application claims priority from and the benefit of Korean Patent Application No. 10-2017-0015799, filed on Feb. 3, 2017, which is hereby incorporated by reference for all purposes as if fully set forth herein.

BACKGROUND

Field

Exemplary embodiments relate to a touch sensor and a display device including the same.

Discussion of the Background

A touch sensor is a type of information input device, which may be provided in a display device. For example, a touch sensor may be attached to one surface of a display panel, or formed integrally with the display panel. A user may input information by pressing or touching the touch sensor while viewing an image displayed on a screen of the display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor having high sensitivity and a display device including the same.

Additional aspects will be set forth in the detailed description which follows, and, in part, will be apparent from the disclosure, or may be learned by practice of the inventive concept.

According to exemplary embodiments, a touch sensor includes a substrate including an active area and a non-active area, a plurality of first electrodes extending in a first direction on the active area, a plurality of second electrodes extending in a second direction crossing the first direction on the active area, a plurality of third electrodes including electrode portions disposed in the first electrodes, respectively, being separated from the first electrodes, and extending in the first direction on the active area, and a sensing circuit including a plurality of signal receivers receiving sensing signals from the first electrodes, respectively, in which each of the signal receivers includes first and second input terminals connected to a pair of first and third electrodes corresponding to each other, respectively, and outputs a signal corresponding to a voltage difference between the first and second input terminals.

Each of the signal receivers may include an amplifier including the first and second input terminals, and the second input terminal may be a reference terminal of the amplifier.

Each of the first electrodes may include a plurality of first sensing cells disposed in the first direction, each of the first sensing cells having at least one opening therein, and a plurality of first connection portions connecting the first sensing cells in the first direction.

Each of the third electrodes may include a plurality of electrode portions disposed in the openings of the first sensing cells, and a plurality of connection lines connecting the electrode portions in the first direction.

The first sensing cells may be disposed on a first layer of the substrate, and the electrode portions may be disposed on a second layer separated from the first layer by at least one insulating layer interposed therebetween.

The first connection portions and the connection lines may be disposed on the second layer and do not to overlap with each other.

The touch sensor may further include a plurality of first dummy patterns disposed in the openings of the first sensing cells and separated from the first sensing cells, in which the plurality of first dummy patterns are disposed on the first layer and overlap with the electrode portions.

Each of the first dummy patterns may be floated and has an island shape.

One of the electrode portions and one of the first dummy patterns that overlap each other may be electrically connected to each other through at least one contact hole passing through the at least one insulating layer.

The second layer may be disposed between the substrate and the first layer.

The first sensing cells and the electrode portions may be disposed on a first layer of the substrate and be separated from each other, and the connection lines may be disposed on a second layer separated from the first layer by at least one insulating layer interposed therebetween, and may be electrically connected to the electrode portions through a contact hole passing through the at least one insulating layer.

Each of the second electrodes may include a plurality of second sensing cells disposed in the second direction, each of the second sensing cells including at least one opening, and a plurality of second connection portions connecting the second sensing cells in the second direction.

The touch sensor may further include a plurality of dummy patterns disposed in the openings of the second sensing cells and separated from the second sensing cells.

The dummy patterns may include at least one of a second dummy pattern provided on a same layer as the second sensing cells, and a third dummy pattern disposed on a different layer from the second sensing cells.

The third electrodes may be electrically connected to different signal receivers through different wiring lines.

The third electrodes may share one wiring line and be commonly connected to second input terminals of the signal receivers through the one wiring line.

The touch sensor may further include a gain regulator electrically connected between the third electrodes and the signal receivers and including at least a variable resistor, in which at least two of the signal receivers may be electrically connected to different nodes of the variable resistor.

According to exemplary embodiments, a display device may include a display panel including a display area on which a plurality of pixels are disposed and a touch sensor including an active area overlapping the display area, in which the touch sensor includes a plurality of first electrodes extending in a first direction on the active area, a plurality of second electrodes extending in a second direction crossing the first direction, a plurality of third electrodes including electrode portions disposed in the first electrodes, respectively, separated from the first electrodes, and extending in the first direction on the active area, and a sensing circuit including a plurality of signal receivers receiving sensing signals from the first electrodes, respectively, each of the signal receivers includes first and second input terminals respectively connected to a pair of first and third electrodes corresponding to each other, respectively, and outputs a signal corresponding to a voltage difference between the first and second input terminals.

The first electrodes may include a plurality of first sensing cells arranged in the first direction, each of the first sensing cells including at least one opening, and a plurality of first connection portions connecting the first sensing cells in the first direction, respectively, and the third electrodes may include a plurality of electrode portions disposed in the openings of the first sensing cells, and a plurality of connection lines connecting electrode portions in the first direction.

The third electrodes may share one wiring line and be commonly connected to second input terminals of the signal receivers through the one wiring line, and the touch sensor may further include a gain regulator electrically connected between the third electrodes and the signal receivers.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 5 is a diagram illustrating an exemplary embodiment relating to a sensor unit shown in FIG. 4.

FIG. 17 is a diagram illustrating a touch sensor according to an exemplary embodiment.

DETAILED DESCRIPTION OF THE ILLUSTRATED EMBODIMENTS

Figure 1:
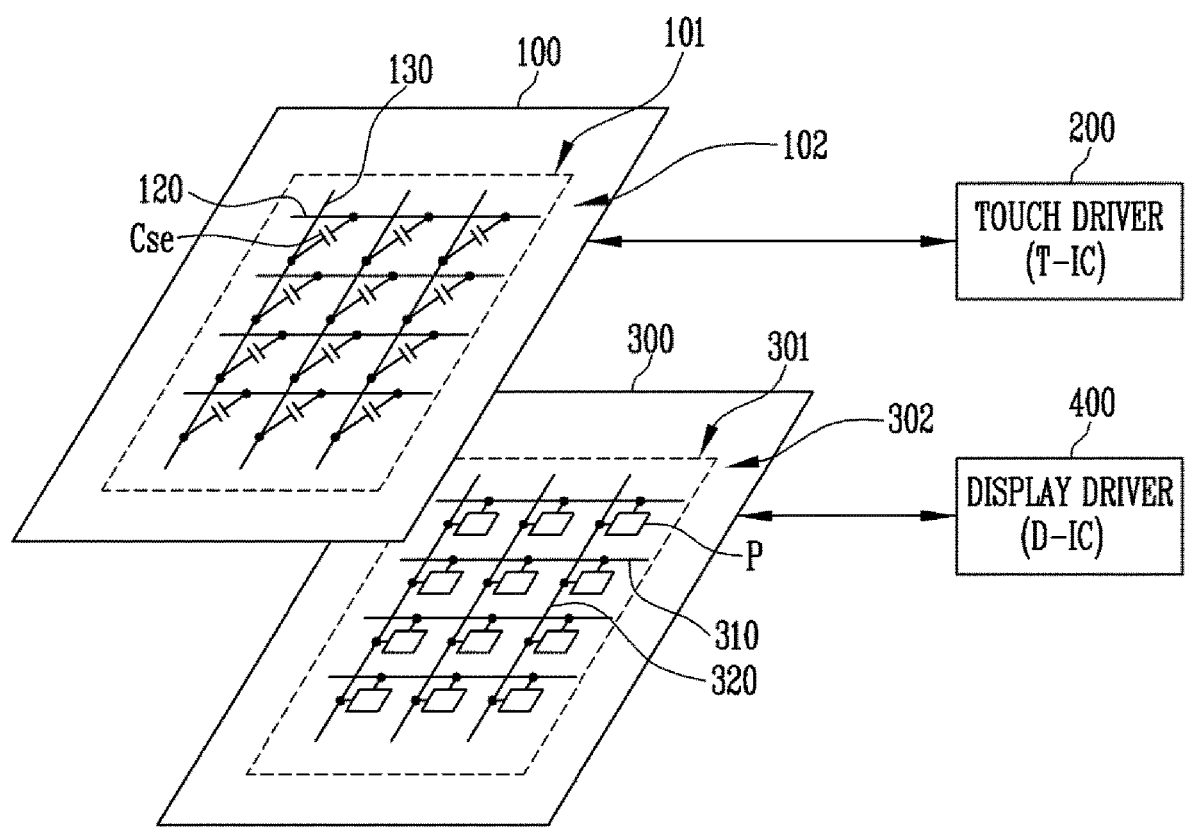
FIG. 1 is a schematic diagram illustrating a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
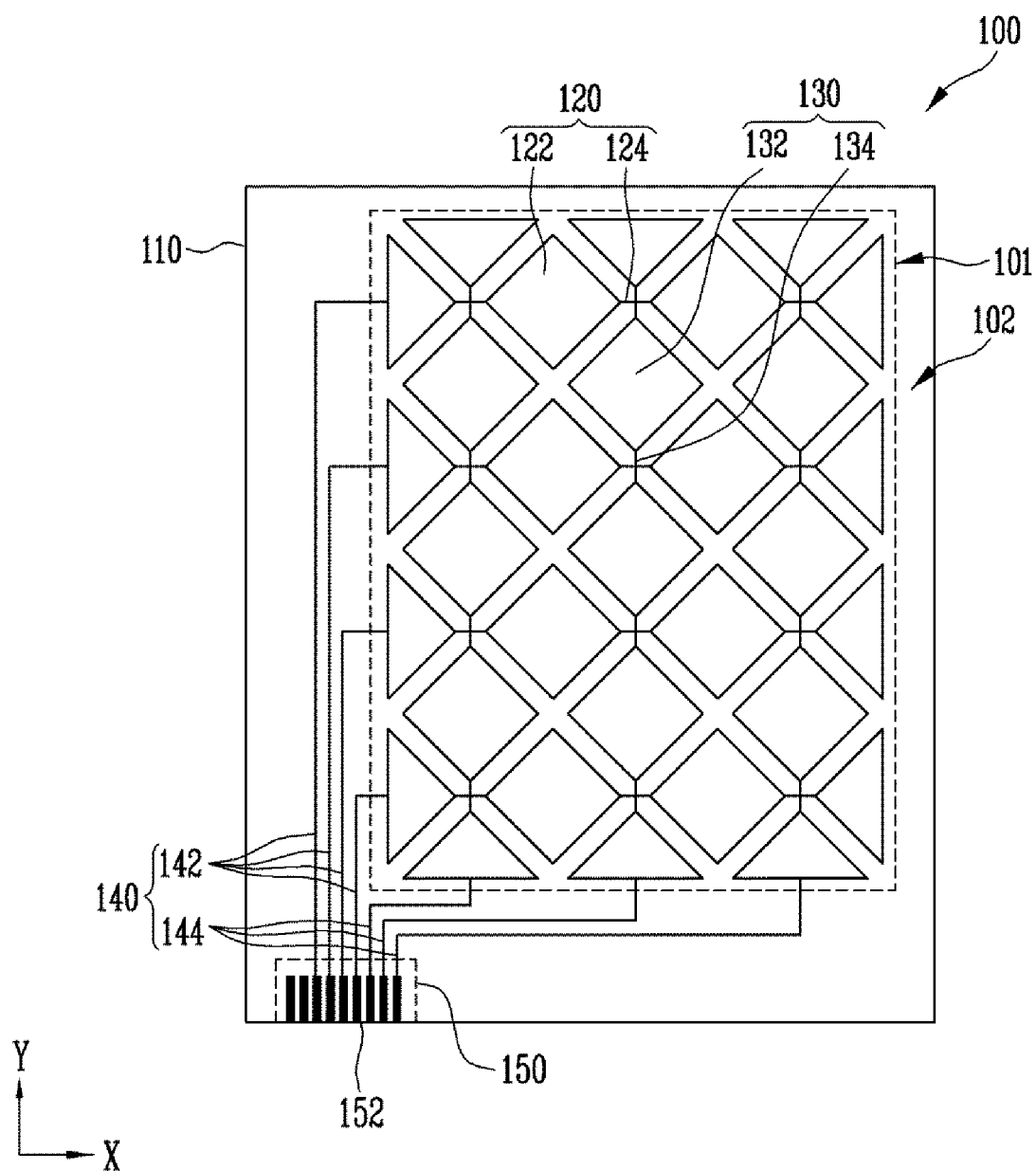
FIG. 2 is a diagram illustrating a sensor unit of a touch sensor according to an exemplary embodiment.

FIG. 1 is a schematic diagram illustrating a display device according to an exemplary embodiment. FIG. 2 is a diagram illustrating a sensor unit of a touch sensor according to an exemplary embodiment.

Referring to FIG. 1, a display device according to an exemplary embodiment may include a sensor unit 100, a touch driver 200, a display panel 300, and a display driver 400. The sensor unit 100 and the touch driver 200 may constitute a touch sensor.

In FIG. 1, the sensor unit 100 and the display panel 300 are shown as being separated from each other. However, the inventive concepts are not limited thereto. For example, the sensor unit 100 and the display panel 300 may be manufactured in a single body.

According to the present exemplary embodiment, the sensor unit 100 may be disposed in at least one area of the display panel 300. For example, the sensor unit 100 may be disposed on at least one surface of the display panel 300 and overlap the display panel 300. More particularly, the sensor unit 100 may be arranged on one (e.g., an upper surface) of both surfaces of the display panel 300, on which an image is displayed. According to another exemplary embodiment, the sensor unit 100 may be directly formed on at least one of both surfaces of the display panel 300 or formed in the display panel 300. For example, the sensor unit 100 may be directly formed on an outer surface of an upper substrate or a lower substrate of the display panel 300 (e.g., an upper surface of the upper substrate or a lower surface of the lower substrate), or directly formed on an inner surface of the upper substrate or the lower substrate (e.g., a lower surface of the upper substrate or an upper surface of the lower substrate).

The sensor unit 100 may include an active area 101, on which a touch input is detected, and a non-active area 102 surrounding at least a portion of the active area 101. According to an exemplary embodiment, the active area 101 may correspond to a display area 301 of the display panel 300, and the non-active area 102 may correspond to a non-display area 302 of the display panel 300. For example, the active area 101 of the sensor unit 100 may overlap with the display area 301 of the display panel 300, and the non-active area 102 of the sensor unit 100 may overlap with the non-display area 302 of the display panel 300.

According to an exemplary embodiment, at least one electrode for detecting a touch input, for example, a plurality of first electrodes 120 and a plurality of second electrodes 130 may be disposed on the active area 101. More particularly, the first and second electrodes 120 and 130 may be disposed on the display area 301 of the display panel 300. The first and second electrodes 120 and 130 may overlap at least one electrode disposed on the display panel 300. For example, when the display panel 300 is an organic light-emitting display panel or a liquid crystal display panel, the first and second electrodes 120 and 130 may overlap with at least a cathode electrode or a common electrode.

More specifically, the sensor unit 100 may include first and second electrodes 120 and 130 crossing each other and disposed on the active area 101. For example, the active area 101 may include the first electrodes 120 extending in a first direction and the second electrodes 130 extending in a second direction crossing the first electrodes 120. According to an exemplary embodiment, the first and second electrodes 120 and 130 may be insulated from each other by at least one insulating layer (not illustrated).

Capacitances Cse may be formed between the first electrodes 120 and the second electrodes 130, more particularly, at intersections therebetween. Each of the capacitances Cse may change when a touch input is made at or around a corresponding point. Therefore, a touch input may be sensed by detecting variations in the capacitances Cse.

The shape, size, and/or arrangement direction of each of the first electrodes 120 and the second electrodes 130 are not particularly limited. According to an exemplary embodiment, the first electrodes 120 and the second electrodes 130 may be configured as shown in FIG. 2, but the inventive concepts are not limited thereto.

Referring to FIG. 2, the sensor unit 100 may include a base substrate 110 including the active area 101 and the non-active area 102, the first electrodes 120 and the second electrodes 130 disposed on the active area 101 of the base substrate 110, and a plurality of wiring lines 140 and a pad portion 150 disposed on the non-active area 102 of the base substrate 110.

The base substrate 110 may form a base of the sensor unit 100. The base substrate 110 may be a rigid substrate or a flexible substrate. More specifically, the base substrate 110 may be a rigid substrate formed of glass or reinforced glass, or a flexible substrate formed of a flexible plastic thin film. However, according to an exemplary embodiment, the base substrate 110 may be one of the substrates forming the display panel 300. For example, when the sensor unit 100 and the display panel 300 are formed integrally with each other, the base substrate 110 may be at least one (e.g., an upper substrate) of the substrates forming the display panel 300 or a thin film encapsulation (TFE) layer.

The first electrodes 120 may extend in a first direction, for example, the X direction. According to an exemplary embodiment, each of the first electrodes 120 arranged in each row may include a plurality of first sensing cells 122 arranged in the first direction and first connection portions 124 physically and/or electrically connecting the first sensing cells 122 in each row in the first direction. According to an exemplary embodiment, the first connection portions 124 may be formed integrally with the first sensing cells 122, or formed as coupling patterns in the form of bridges.

Each of the first electrodes 120 may be a driving electrode (Tx electrode) receiving a driving signal for touch driving, and/or a sensing electrode (Rx electrode) outputting a sensing signal corresponding to the driving signal input to the driving electrode. For example, when a touch sensor is a mutual capacitance touch sensor, the first electrodes 120 may be sensing electrodes outputting sensing signals corresponding to a touch input.

The second electrodes 130 may extend in a second direction, for example, the Y direction. According to an exemplary embodiment, each of the second electrodes 130 arranged in each column may include a plurality of second sensing cells 132 arranged in the second direction and a plurality of second connection portions 134 physically and/or electrically connecting the second sensing cells 132 in each column in the second direction. According to an exemplary embodiment, the second connection portions 134 may be formed integrally with the second sensing cells 132, or include coupling patterns in the form of bridges. Each of the second electrodes 130 may be a driving electrode receiving a driving signal for touch driving, and/or a sensing electrode outputting a sensing signal corresponding to the driving signal input to the driving electrode. For example, when a touch sensor is a mutual capacitance touch sensor, the first electrodes 120 may be sensing electrodes and the second electrodes 130 may be driving electrodes.

Each of the first and second sensing cells 122 and 132 may have a diamond shape, as shown in FIG. 2. However, the shape and size of the first and second sensing cells 122 and 132 may vary. For example, the first and second sensing cells 122 and 132 may have a circular shape, a hexagonal shape, or another shape.

According to an exemplary embodiment, the wiring lines 140 for electrically connecting the first and second electrodes 120 and 130, which are disposed on the active area 101 to the touch driver 200, may be arranged on the non-active area 102. According to an exemplary embodiment, the wiring lines 140 may include first wiring lines 142 electrically connecting the first electrodes 120 to the pad portion 150, and second wiring lines 144 electrically connecting the second electrodes 130 to the pad portion 150. For example, each of the wiring lines 140 may electrically connect one of the first and second electrodes 120 and 130 to a predetermined pad 152 provided on the pad portion 150. The first wiring lines 142 and the second wiring lines 144 may be connected to ends of the first electrodes 120 and the second electrodes 130, respectively, as shown in FIG. 2. However, the connection structure between the first and second electrodes 120 and 130 and the first and second wiring lines 142 and 144 may be varied. For example, according to another exemplary embodiment, at least one of the first wiring lines 142 and the second wiring lines 144 may be connected to both ends of the first electrodes 120 or the second electrodes 130.

The pad portion 150 may include a plurality of pads 152 electrically connecting the first and second electrodes 120 and 130 to an external driving circuit, for example, the touch driver 200. The sensor unit 100 and the touch driver 200 may communicate with each other through the pad portion 150.

Referring back to FIG. 1, the touch driver 200 may be electrically connected to the sensor unit 100 and transmit/receive a signal for driving the sensor unit 100. For example, the touch driver 200 may apply a driving signal to the sensor unit 100 and receive a sensing signal corresponding to the driving signal from the sensor unit 100 to detect a touch input. The touch driver 200 may include a driving circuit and a sensing circuit. According to an exemplary embodiment, the driving circuit and the sensing circuit may be integrated into a single touch IC (T-IC), but the inventive concepts are not limited thereto. According to an exemplary embodiment, the driving circuit may be electrically connected to the driving electrode of the sensor unit 100, for example, the second electrodes 130 to sequentially provide a driving signal thereto. The sensing circuit may be electrically connected to the sensing electrode of the sensor unit 100, for example, the first electrodes 120, and receive sensing signals from the first electrodes 120, and perform signal processing thereon to detect a touch input.

The display panel 300 may include the display area 301 and the non-display area 302 surrounding at least one portion of the display area 301. A plurality of scan lines 310 and a plurality of data lines 320, and a plurality of pixels P connected to the scan lines 310 and the data lines 320 may be provided on the display area 301. Wiring lines for providing various driving signals and/or a driving power supply to the pixels P may be provided on the non-display area 302.

As used herein, the type of the display panel 300 may not be particularly limited. For example, the display panel 300 may be a self-luminous display panel such as an Organic Light Emitting Display (OLED) panel. Alternatively, the display panel 300 may be a non-luminous display panel, such as a Liquid Crystal Display (LCD) panel, an Electro-Phoretic Display (EPD) panel, and an Electro-Wetting Display (EWD) panel. When the display panel 300 is a non-luminous display panel, the display device may further include a backlight unit to supply light to the display panel 300.

The display driver 400 may be electrically connected to the display panel 300 and provide a signal for driving the display panel 300. For example, the display driver 400 may include at least one of a scan driver providing scan signals to the scan lines 310, a data driver providing data signals to the data lines 320, and a timing controller driving the scan driver and the data driver. According to an exemplary embodiment, the scan driver, the data driver, and/or the timing controller may be integrated into a single display IC (D-IC), but the inventive concepts are not limited thereto. For example, according to another exemplary embodiment, at least one of the scan driver, the data driver, and the timing controller may be integrated into or mounted onto the display panel 300.

Figure 3:
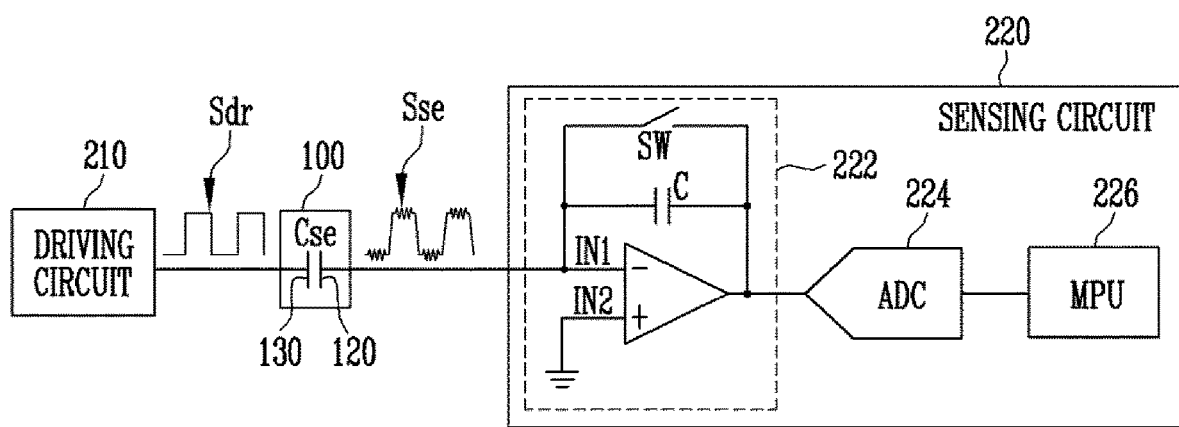
FIG. 3 is a diagram illustrating a touch sensor according to an exemplary embodiment.

FIG. 3 is a diagram illustrating a touch sensor according to an exemplary embodiment, which shows one of the first electrodes 120 and one of the second electrodes 130 provided on the sensor unit, and a capacitance Cse formed at an intersection between the first and second electrodes 120 and 130. In addition, FIG. 3 illustrates a driving circuit and a sensing circuit on the basis of the first and second electrodes 120 and 130 forming the capacitance.

Referring to FIG. 3, the sensor unit 100 may include a pair of the first electrode 120 and the second electrode 130 forming the capacitance Cse. The second electrode 130 may be electrically connected to a driving circuit 210 of the touch driver 200, and the first electrode 120 may be electrically connected to a sensing circuit 220 of the touch driver 200.

According to a method of driving the above touch sensor, first, a driving signal Sdr may be applied from the driving circuit 210 to the second electrode 130. When the sensor unit 100 includes the plurality of second electrodes 130 as shown in FIGS. 1 and 2, the driving circuit 210 may sequentially supply the driving signal Sdr to the second electrodes 130. A sensing signal Sse corresponding to the driving signal Sdr applied to the second electrode 130 may be output from the first electrode 120 by coupling of the capacitance Cse. The sensing signal Sse may be input to the sensing circuit 220 of the touch driver 200. When the sensor unit 100 includes the plurality of first electrodes 120 as shown in FIGS. 1 and 2, the sensing circuit 220 may include a plurality of sensing channels electrically connected to the first electrode 120, respectively, and receive sensing signals output from the plurality of first electrodes 120 through the sensing channels.

The sensing circuit 220 may amplify, convert, and process the sensing signal Sse input from each of the first electrodes 120 and detect a touch input according to amplification, conversion, and signal processing results. The sensing circuit 220 may include a signal receiver 222, an Analog-to-Digital Converter (hereinafter, referred to as "ADC") 224, and a signal processor 226.

The signal receiver 222 may receive the sensing signal Sse from each of the first electrodes 120. The signal receiver 222 may amplify and output the sensing signal Sse. For example, the signal receiver 222 may be embodied as an Analog Front End (hereinafter, referred to as "AFE") including an Operational (OP) amplifier. According to an exemplary embodiment, a first input terminal IN1 of the signal receiver 222, for example, an inverting input terminal of the OP amplifier may be electrically connected to the first electrode 120. In particular, the sensing signal Sse may be input to the first input terminal IN1 from the first electrode 120. A capacitor C and a switch SW may be connected in parallel between the first input terminal IN1 and an output terminal. A second input terminal IN2 of the signal receiver 222, for example, a non-inverting input terminal of the OP amplifier may be a reference terminal, which may be electrically connected to a ground (hereinafter, "GND") power source terminal.

The ADC 224 may convert an analog signal input from the signal receiver 222 into a digital signal. According to an exemplary embodiment, the number of ADCs 224 may be the same as the number of first electrodes 120, so that each of the ADCs 224 may correspond to each of the sensing channels corresponding to each of the first electrodes 120. Alternatively, according to another exemplary embodiment, the plurality of first electrodes 120 may share one ADC 224. In this case, a switching circuit may be further provided between the signal receiver 222 and the ADC 224.

The signal processor 226 may process a signal (i.e., a digital signal) converted by the ADC 224 and detect a touch input according to a signal processing result. For example, the signal processor 226 may comprehensively analyze signals (amplified and converted sensing signal Sse) input from the plurality of first electrodes 120 through the signal receiver 222 and the ADC 224, to detect whether a touch input is made or not and where the touch input is made. According to an exemplary embodiment, the signal processor 226 may include a microprocessor (MPU). A memory for driving the signal processor 226 may be additionally provided in the sensing circuit 220. However, the configuration of the signal processor 226 is not limited thereto. In another example, the signal processor 226 may include a microcontroller (MCU).

The above-described touch sensor may be coupled to the display panel 300. For example, the sensor unit 100 of the touch sensor may be manufactured integrally with the display panel 300, or manufactured separately from the display panel 300 and then attached to at least one surface of the display panel 300.

As described above, when the sensor unit 100 is coupled to the display panel 300, a parasitic capacitance may occur between the sensor unit 100 and the display panel 300. Noise from the display panel 300 may be transferred to the touch sensor, particularly, the sensor unit 100 by coupling of the parasitic capacitance. For example, noise caused by a driving signal used for driving of the display panel 300 may be introduced into the sensor unit 100. When the first electrode 120 and the second electrode 130 may be arranged to overlap with a cathode electrode or a common electrode, for example, display noise caused by the driving signal applied to the cathode electrode or the common electrode may be introduced into the sensor unit 100.

The noise introduced into the sensor unit 100 may cause ripple of the sensing signal Sse. As a result, sensitivity of the touch sensor may be reduced. Accordingly, exemplary embodiments of the present invention improve the sensitivity of the touch sensor, which will be described in more detail below.

Figure 4:
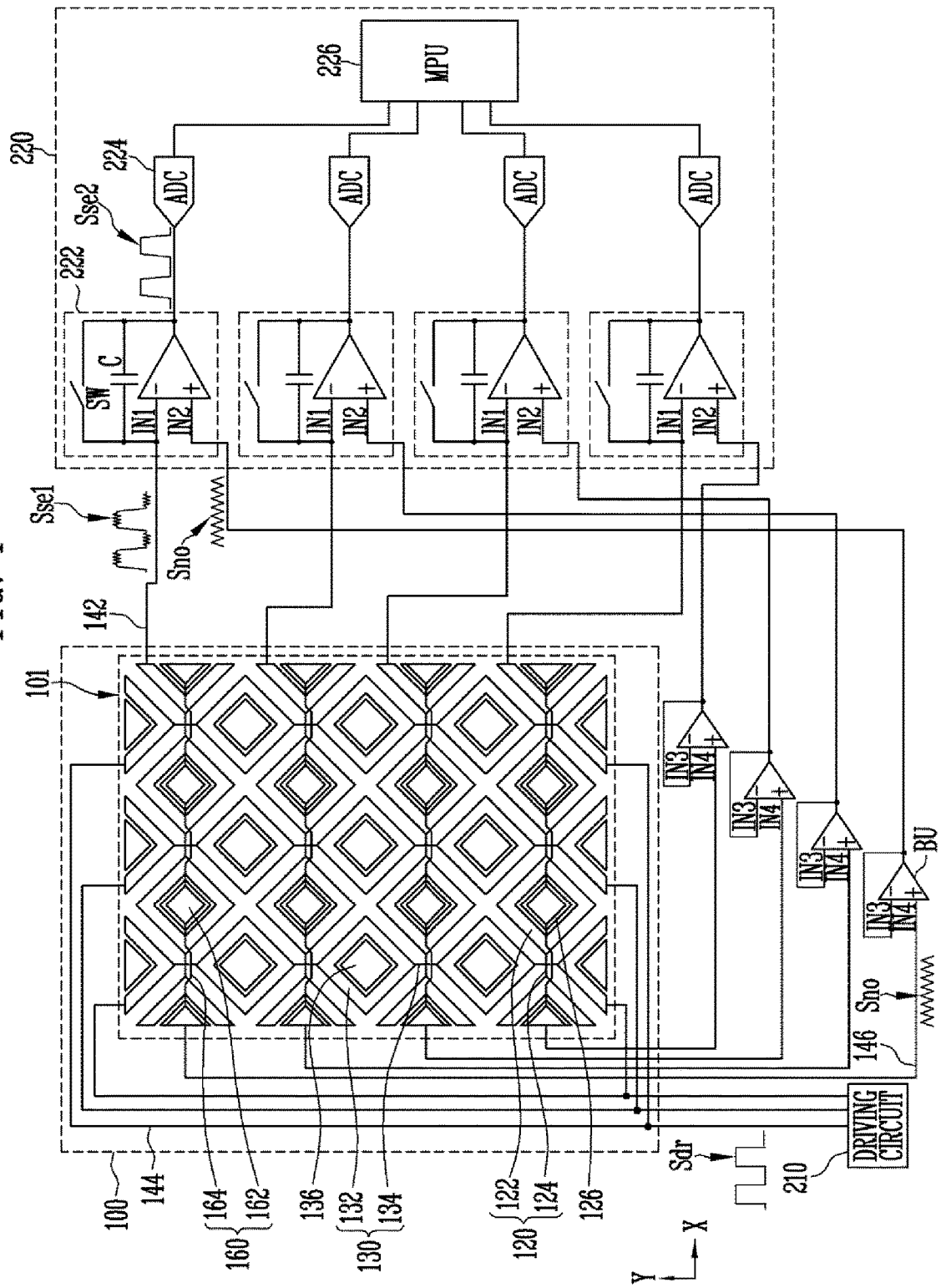
FIG. 4 is a diagram illustrating a touch sensor according to an exemplary embodiment.

FIG. 4 is a diagram illustrating a touch sensor according to an exemplary embodiment. For illustrative purposes, the base substrate and the pad portion shown in FIG. 2 are omitted in FIG. 4. However, the sensor unit of FIG. 4 may be provided on the base substrate. In FIG. 4, the same reference characters are illustrated to indicate substantially similar or identical components previously described in FIGS. 1 to 3, and thus, repeated descriptions thereof will be omitted.

Referring to FIG. 4, a touch sensor according to an exemplary embodiment may include the sensor unit 100, the driving circuit 210, and the sensing circuit 220. According to an exemplary embodiment, the sensor unit 100 may further include a plurality of third electrodes 160 extending in the same direction as the first electrodes 120. The sensor unit 100 may be electrically connected to additional components, circuits, and etc.

The sensor unit 100 may include the first electrodes 120, the second electrodes 130, and the third electrodes 160, which are separated from each other. At least some of the first electrodes 120, the second electrodes 130, and the third electrodes 160 may have an overlapping and/or intersecting area, and be separated by at least one insulating layer (not illustrated). More particularly, the first electrodes 120, the second electrodes 130, and the third electrodes 160 may be separated and electrically insulated from each other, and a capacitance may be formed therebetween.

According to an exemplary embodiment, the first electrodes 120 may extend in the first direction on the active area 101, and the second electrodes 130 may extend in the second direction on the active area 101 and cross the first electrodes 120. In addition, the third electrodes 160 may extend in the first direction on the active area 101, and a portion of each of the third electrodes 160 may overlap with each of the first electrodes 120.

According to an exemplary embodiment, the first electrodes 120 may include a plurality of first sensing cells 122 and a plurality of first connection portions 124 connecting the first sensing cells 122 in the first direction, respectively.

However, the shape of the first electrodes 120 is not limited thereto. For example, in another exemplary embodiment, each of the first electrodes 120 and/or the second electrodes 130 may be formed as an integral bar type electrode.

According to an exemplary embodiment, each of the first sensing cells 122 may include at least one opening or hole. For example, a central portion of each of the first sensing cells 122 may be opened.

According to an exemplary embodiment, first dummy patterns 126 separated from the first sensing cells 122 and floated in the form of an island may be disposed in the openings of the first sensing cells 122, and be disposed on the same layer as the first sensing cells 122. However, the inventive concepts are not limited to the exemplary embodiment including the first dummy patterns 126. For example, according to another exemplary embodiment, the opening may not be formed in each of the first sensing cells 122, or the first dummy patterns 126 may be omitted.

According to an exemplary embodiment, electrode portions 162 of the third electrodes 160 may be disposed in, or surrounded by, the first electrodes 120 corresponding thereto. For example, the electrode portions 162 may be provided in the openings of the first sensing cell 122, respectively, and separated from the first sensing cells 122. For example, each of the electrode portions 162 may be disposed in the opening of each of the first electrodes 120 and overlap with each of the first dummy patterns 126.

According to an exemplary embodiment, each of the electrode portions 162 and each of the first dummy patterns 126 corresponding thereto may have the same or different areas. For example, a pair of the electrode portion 162 and the first dummy pattern 126 overlapping with each other may have the same area and completely overlap with each other. However, FIG. 4 illustrates an exemplary embodiment in which the electrode portion 162 and the first dummy pattern 126 have different areas from each other in order to distinctively show the electrode portions 162 and the first dummy patterns 126. More particularly, each of the electrode portions 162 has an area smaller than an area of each of the first dummy patterns 126, and each of the electrode portions 162 is disposed in an area where the first dummy patterns 126 are disposed.

The electrode portions 162 disposed in the same line along the first direction may be electrically connected through the connection lines 164 along the first direction to form the third electrodes 160. In particular, the third electrodes 160 may include a plurality of electrode portions 162, each of which is provided in each of the first sensing cells 122, and a plurality of connection lines 164 physically and/or electrically connecting the electrode portions 162 in the first direction, respectively.

According to an exemplary embodiment, each of the third electrodes 160 may be electrically connected to the sensing circuit 220 through each of the third wiring lines 146. In addition, according to an exemplary embodiment, a buffer BU may be provided between each of the third electrodes 160 and each of the signal receivers 222 corresponding to each other. The buffer BU electrically connected between the third electrode 160 and the signal receiver 222 corresponding to each other may buffer and output a signal (e.g., a noise signal Sno) input from the third electrode 160. According to an exemplary embodiment, a first input terminal IN3 of the buffer BU, for example, an inverting input terminal, may be electrically connected to the output terminal OUT, and a second input terminal IN4 of the buffer BU, for example, a non-inverting input terminal, may be electrically connected to the corresponding third electrode 160 and receive the noise signal Sno.

The first electrode 120 and the third electrode 160 that correspond to each other, among the first electrodes 120 and the third electrodes 160, may form a pair. For example, the first electrode 120 disposed in the first row of the active area 101 and the third electrode 160 including the electrode portion 162 disposed in the opening of the first electrode 120 may form a pair.

According to an exemplary embodiment, a pair of the first electrode 120 and the third electrode 160 may have at least one overlapping area. For example, the connection lines 164 may electrically connect the electrode portions 162 through overlapping areas with the first sensing cells 122. The connection lines 164 may be disposed on a different layer from the first sensing cells 122 and separated from the first sensing cells 122. Therefore, the first electrodes 120 and the third electrodes 160 may be electrically insulated from each other.

The first connection portions 124 may be connected integrally with the first sensing cells 122 on the same layer as the first sensing cells 122, or disposed on a different layer from the first sensing cells 122, and electrically connected to the first sensing cells 122 through at least one contact hole. For example, the first connection portions 124 may be disposed on the same layer as the electrode portions 162 and/or the connection lines 164 so as not to overlap with the electrode portions 162 and/or the connection lines 164.

According to an exemplary embodiment, the second sensing cells 132 may have at least one opening or hole therein. For example, a central portion of each of the second sensing cells 132 may be opened.

In addition, according to an exemplary embodiment, second dummy patterns 136 separated from the second sensing cells 132 may be provided in the openings of the second sensing cells 132, respectively. For example, the second dummy patterns 136 separated from the second sensing cells 132 and floated in the form of an island may be disposed in the openings of the second sensing cells 132, and be disposed on the same layer as the second sensing cells 132.

When the second electrodes 130 have a similar structure and/or shape to the first electrodes 120, the entire active area 101 may have a uniform visibility. However, the inventive concepts are not limited thereto. For example, according to another exemplary embodiment, the openings may not be formed in the second sensing cells 132, or the second dummy patterns 136 may be omitted.

According to the exemplary embodiment illustrated in FIG. 4, the first and second electrodes 120 and 130 may have plate-shaped sensing cells 122 and 132, and the third electrodes 160 may include the electrode portions 162. However, the inventive concepts are not limited thereto. For example, according to another exemplary embodiment, at least one of the first, second, and third electrodes 120, 130, and 160 may be a mesh-shaped electrode.

The driving circuit 210 may be electrically connected to the second electrodes 130 and apply the driving signal Sdr to the second electrodes 130. For example, the driving circuit 210 may sequentially apply the driving signal Sdr to the second electrodes 130 during a period when the touch sensor is activated. According to an exemplary embodiment, the driving signal Sdr may be an alternating signal having a predetermined cycle, such as a pulse wave.

The sensing circuit 220 may include a plurality of signal receivers 222 receiving sensing signals Sse1 from the first electrodes 120, a plurality of ADCs 224 electrically connected to output terminals of the signal receivers 222, and the signal processor 226 receiving conversion signals from the ADCs 224 to detect a touch input. Since the signal receiver 222, the ADC 224, and the signal processor 226 are substantially similar to those described with reference to FIG. 3, repeated descriptions thereof will be omitted.

In the exemplary embodiment shown in FIG. 4, the first and second input terminals IN1 and IN2 of each of the signal receivers 222 may be electrically connected to a pair of the first and third electrodes 120 and 160 corresponding thereto. For example, the first input terminal IN1 of the first signal receiver 222, which receives the sensing signal Sse1 from the first electrode 120 disposed in the first row of the active area 101, may be electrically connected to the first electrode 120 in the first row. The second input terminal IN2 of the first signal receiver 222 may be electrically connected to the third electrode 160 in the first row. According to an exemplary embodiment, each of the signal receivers 222 may include an amplifier including the first and second input terminals IN1 and IN2, and the second input terminal IN2 may be a reference terminal or a ground terminal of the signal receiver 222 (e.g., AFE).

Each of the signal receivers 222 may output a signal corresponding to a voltage difference between the first and second input terminals IN1 and IN2.

As described above, according to an exemplary embodiment, electrodes for detecting a touch input, for example, the first, second, and third electrodes 120, 130, and 160 may be provided. The third electrodes 160 may be insulated from the first and second electrodes 120 and 130. Therefore, a parasitic capacitance may be formed between the third electrodes 160 and the first and/or second electrode 120 and/or 130.

The third electrodes 160 may be electrically connected to the second input terminals IN2 (reference terminals) of the signal receivers 222, respectively. Thus, a reference voltage of each of the signal receivers 222 may be changed in conjunction with a voltage variation of each of the third electrodes 160. In other words, a reference potential of each of the signal receivers 222 may be changed by a potential (voltage level) of each of the third electrodes 160.

The potential of each of the third electrodes 160 may be changed by noise introduced into the sensor unit 100 from the display panel 300. For example, the potential of each of the third electrodes 160 may be changed in response to common mode noise commonly introduced into the first, second, and third electrodes 120, 130, and 160 from the display panel 300.

Therefore, according to an exemplary embodiment, when the third electrodes 160 are further provided on the active area 101, and reference potentials of the signal receivers 222 are changed by output signals from the third electrodes 160, the common mode noise introduced into the sensor unit 100 may be cancelled. More specifically, one pair of the first electrode 120 and the third electrode 160 may have ripple corresponding to the common mode noise. Particularly, one pair of the first electrode 120 and the third electrode 160 may extend in the same direction and arranged at positions corresponding to each other in the active area 101, so that the pair of the first and third electrodes 120 and 160 may receive noise having identical or substantially similar shapes and/or magnitudes. In addition, the third electrodes 160 may be electrically connected to different signal receiver 222 through different third wiring lines 146. In other words, the second input terminal IN2 of the signal receiver 222 having the first input terminal IN1 connected to the predetermined first electrode 120 may be electrically connected to the third electrode 160 forming the pair with the first electrode 120 through the third wiring line 146.

As described above, when the first and second input terminals IN1 and IN2 of each of the signal receiver 222 are electrically connected to the first and third electrodes 120 and 160 corresponding thereto, a noise component (ripple) included in the sensing signal Sse1 from the first electrode 120 may be offset in the signal receiver 222. Therefore, the signal receiver 222 may output a sensing signal Sse2, from which noise is cancelled or reduced.

In addition, according to an exemplary embodiment, the electrode portions 162 of the third electrodes 160 may be disposed in and/or surrounded by the respective first electrodes 120. Thus, a sufficient distance between each of the second electrodes 130 receiving the driving signal Sdr and each of the third electrodes 160 receiving the noise signal Sno may be provided. Therefore, the noise signal Sno may be effectively detected by reducing or preventing voltage variations of the third electrodes 160 by the driving signal Sdr.

According to the above-described exemplary embodiment, sensitivity may be improved by increasing a signal-to-noise ratio (SNR) of the touch sensor. In other words, according to an exemplary embodiment, a touch sensor with high sensitivity and a display device having the touch sensor may be provided.

Exemplary embodiments may be usefully applicable to a display device, in which the distance between the sensor unit 100 and the display panel 300 is short. For example, a touch sensor according to exemplary embodiments may be usefully applicable to an on-cell type display device to improve touch sensitivity, in which the first and second electrodes 120 and 130 are directly formed on the upper substrate or the thin film encapsulation layer of the display panel 300, and is sensitive to noise. However, an application range of the inventive concepts is not limited thereto, and exemplary embodiments may also be applicable to various types of display devices or electronic devices.

Figure 6A:
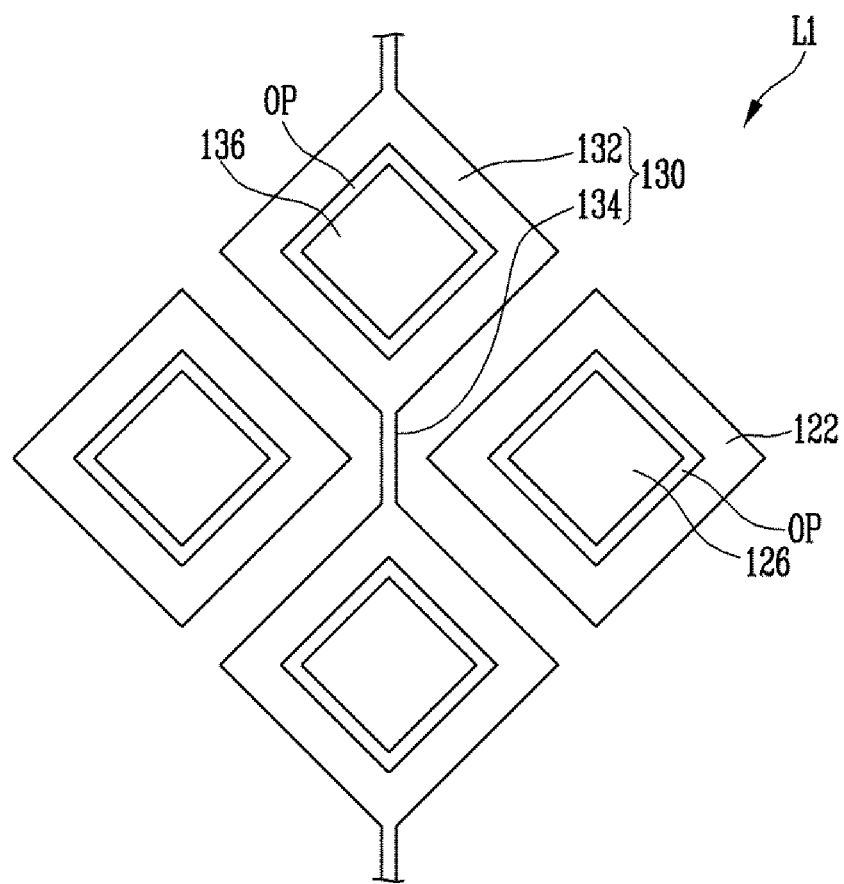
FIG. 6A is a diagram illustrating elements formed on a first plane of a sensor unit shown in FIG. 5.
Figure 6B:
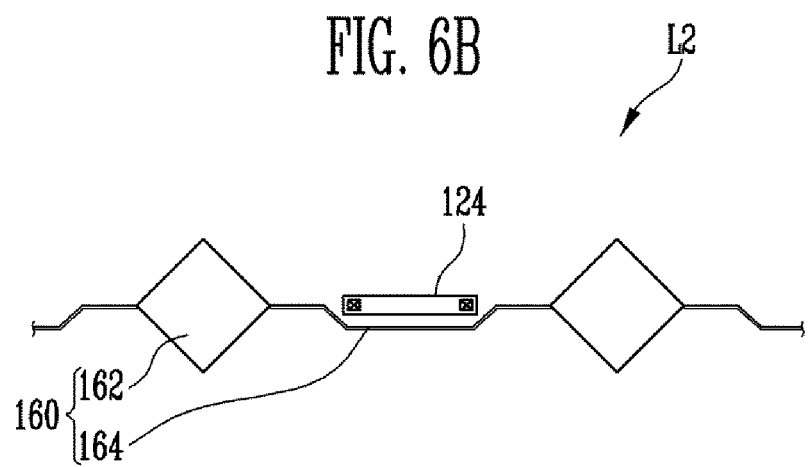
FIG. 6B is a diagram illustrating elements formed on a second plane of a sensor unit shown in FIG. 5.
Figure 7A:
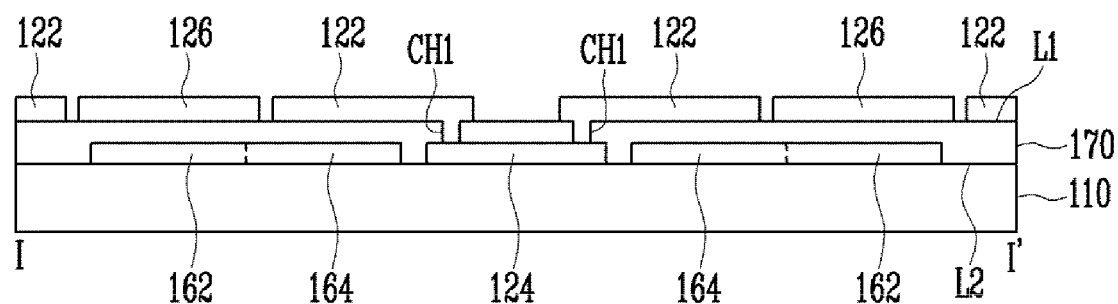
FIG. 7A is a cross-sectional view taken along line I-I' of FIG. 5 according to an exemplary embodiment.
Figure 7B:
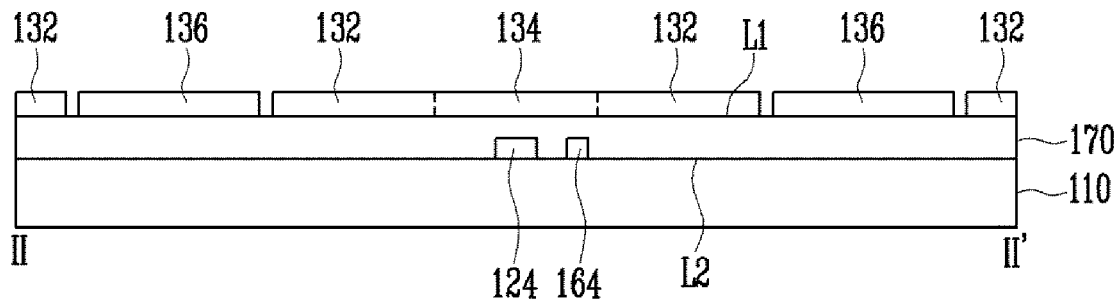
FIG. 7B is a cross-sectional view taken along line II-IF of FIG. 5 according to an exemplary embodiment.
Figure 8A:
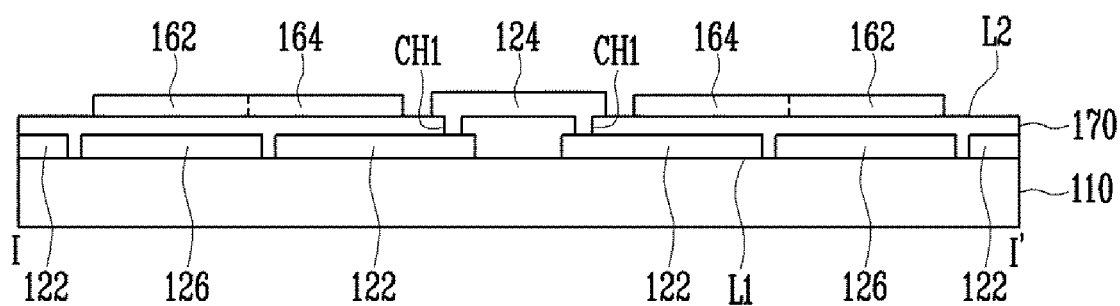
FIG. 8A is a cross-sectional view taken along line I-I' of FIG. 5 according to an exemplary embodiment.
Figure 8B:
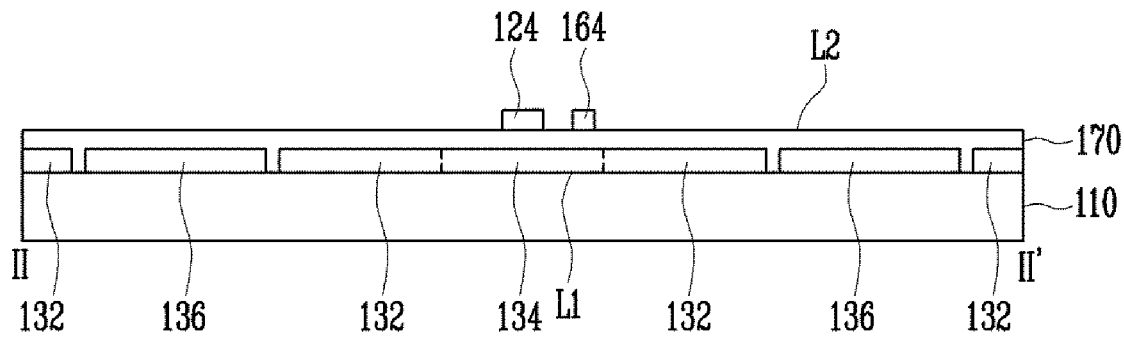
FIG. 8B is a cross-sectional view taken along line II-IF of FIG. 5 according to an exemplary embodiment.

FIG. 5 illustrates an exemplary embodiment relating to the sensor unit shown in FIG. 4. FIG. 6A illustrates elements formed on a first plane of a sensor unit shown in FIG. 5. FIG. 6B illustrates elements formed on a second plane of the sensor unit shown in FIG. 5. FIG. 7A shows a cross-sectional view taken along line I-I' of FIG. 5 according to an exemplary embodiment. FIG. 7B shows a cross-sectional view taken along line II-IF of FIG. 5 according to an exemplary embodiment. FIG. 8A shows a cross-sectional view taken along line I-I' of FIG. 5 according to an exemplary embodiment. In FIGS. 5 to 8B, the same reference characters are illustrated to indicate substantially similar or identical components previously described in FIG. 4, and thus, repeated descriptions thereof will be omitted.

Referring to FIGS. 5 to 8B, according to an exemplary embodiment, the first sensing cells 122 and the second sensing cells 132 may be disposed on the same layer. For example, the first sensing cells 122 and the second sensing cells 132 may be disposed on a first plane L1 of the substrate 110. In addition, one of the first connection portions 124 and the second connection portions 134 may be disposed on the first plane L1, together with the first and second sensing cells 122 and 132. For example, the second connection portions 134 may be connected integrally with the second sensing cells 132 and disposed on the first plane L1. However, the inventive concepts are not limited thereto. For example, in another exemplary embodiment, both first and second connection portions 124 and 134 may be disposed on a layer different from the first and second sensing cells 122 and 132, or the first and second sensing cells 122 and 132 may be disposed on different layers from each other.

According to an exemplary embodiment, the first connection portions 124 may be disposed on a second plane L2 different from the first plane L1 with at least one insulating layer, for example, the first insulating layer 170 interposed therebetween. According to an exemplary embodiment, the second plane L2 may be disposed between the substrate 110 and the first plane L1. More particularly, the first connection portions 124 may be formed as a lower bridge as shown in FIGS. 7A and 7B. However, the inventive concepts are not limited thereto. For example, according to another exemplary embodiment illustrated in FIGS. 8A and 8B, the order in which the first plane L1 and the second plane L2 are disposed may be reversed. In other words, according to an embodiment, the first plane L1 may be disposed between the substrate 110 and the second plane L2, and the first connection portions 124 may be formed as an upper bridge. According to another exemplary embodiment, the first connection portions 124 and the third electrode 160 may be disposed in different layers, which will be described below. When the first connection portions 124 and the first sensing cells 122 are disposed on different layers, the first connection portions 124 may be electrically connected between neighboring first sensing cells 122 through a first contact hole CH1.

According to an exemplary embodiment, openings OP may be formed in the first sensing cells 122, for example, in central portions thereof. The first dummy patterns 126 may be arranged in the openings OP and separated from the first sensing cells 122. In addition, the openings OP may be formed in the second sensing cells 132, for example, in central portions thereof, and the second dummy patterns 136 may be arranged in the openings OP and separated from the second sensing cells 132. According to an exemplary embodiment, the first and second dummy patterns 126 and 136 may be disposed on the first plane L1 of the sensor unit 100, together with the first and second sensing cells 122 and 132. However, the inventive concepts are not limited thereto. For example, according to another exemplary embodiment, at least one of the first and second dummy patterns 126 and 136 may be omitted, or disposed on a different layer from the first and second sensing cells 122 and 132.

According to an exemplary embodiment, the electrode portions 162 may be disposed in the first sensing cells 122 and separated from the first sensing cells 122. For example, the electrode portions 162 may be disposed on the second plane L2. According to an exemplary embodiment, to reduce parasitic capacitance between the first and second electrodes 120 and 130 and the third electrodes 160, the electrode portions 162 may be disposed in the first sensing cells 122 so as not to overlap with the first sensing cells 122. For example, the electrode portions 162 may have a smaller area than the first dummy patterns 126 and be disposed under the first dummy patterns 126. In other words, the electrode portions 162 may be disposed in central portions of the first sensing cells 122. However, the inventive concepts are not limited thereto. The area and/or position of the electrode portions 162 may vary. For example, as described above, a pair of the electrode portion 162 and the first dummy pattern 126 corresponding to each other may have the same area and completely overlap with each other.

According to an exemplary embodiment, the electrode portions 162 may be connected in the first direction by the connection lines 164. A portion of the connection line 164 may overlap with the first sensing cell 122. According to an exemplary embodiment, the electrode portions 162 and the connection lines 164 may be disposed on the second plane L2 of the sensor unit 100, together with the first connection portions 124. The electrode portions 162 and the connection lines 164 may be connected integrally with each other.

When the electrode portions 162 and the connection lines 164 are disposed on the same layer as the first connection portions 124, the connection lines 164 may not to overlap with the first connection portion 124. For example, the connection lines 164 may bypass so as not to pass through the area where the first connection portions 124 are disposed, such that the connection lines 164 electrically connect neighboring electrode portions 162. As a result, the first and third electrodes 120 and 160 corresponding to each other may remain insulated from each other.

According to the above-described exemplary embodiment, the openings OP may be formed in the first electrodes 120, and the electrode portions 162 of the third electrodes 160 may be disposed in the openings OP and be separated from the first electrodes 120. For example, according to an exemplary embodiment, the openings OP may be formed in the first sensing cells 122, the floated first dummy patterns 126 may be arranged in the openings OP, and the electrode portions 162 of the third electrodes 160 may be disposed to overlap with the first dummy patterns 126. For example, an area of the electrode portions 162 of the third electrodes 160 may be less than or equal to an area of the first dummy patterns 126 and be disposed under the first dummy patterns 126 (e.g., between the substrate 110 and the first dummy patterns 126). As a result, the noise signal Sno may be more effectively detected by reducing the parasitic capacitance formed between the third electrodes 160 and the first and/or second electrode 120 and/or 130.

In addition, according to an exemplary embodiment, the floated second dummy patterns 136 may be disposed in, or surrounded by, the second sensing cells 132, so that the entire active area 101 may have a uniform visibility.

Figure 9:
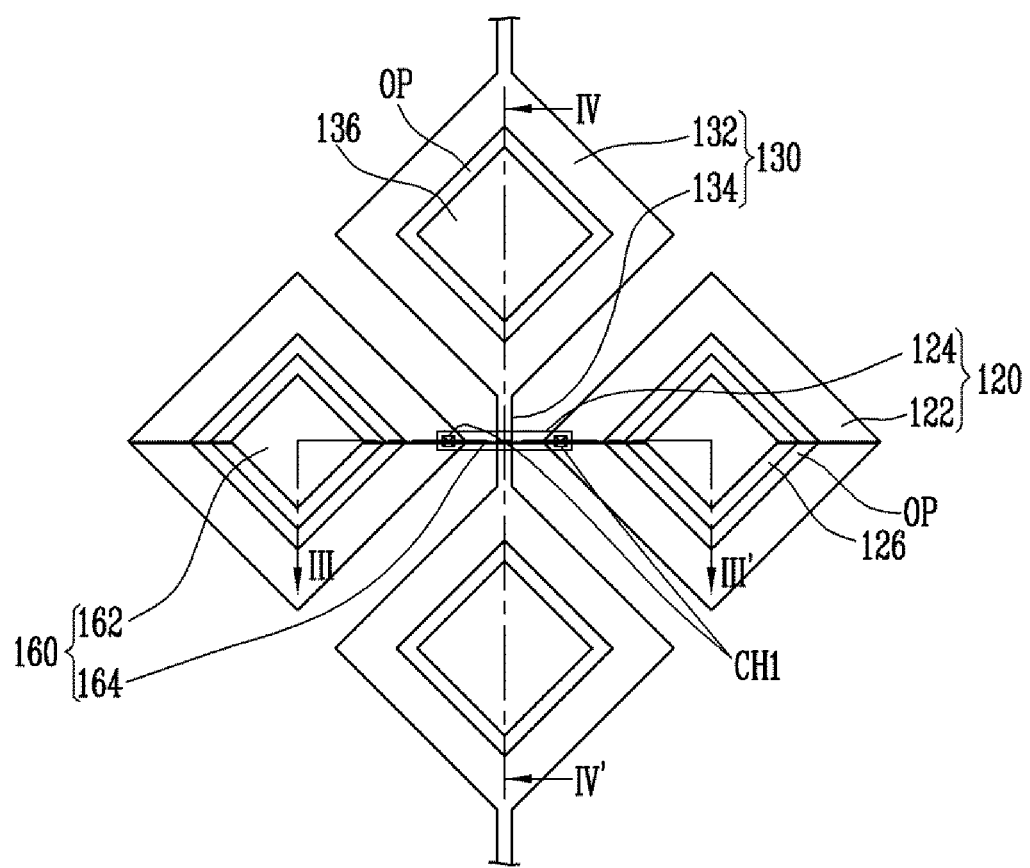
FIG. 9 is a diagram illustrating an exemplary embodiment relating to a sensor unit shown in FIG. 4.
Figure 10A:
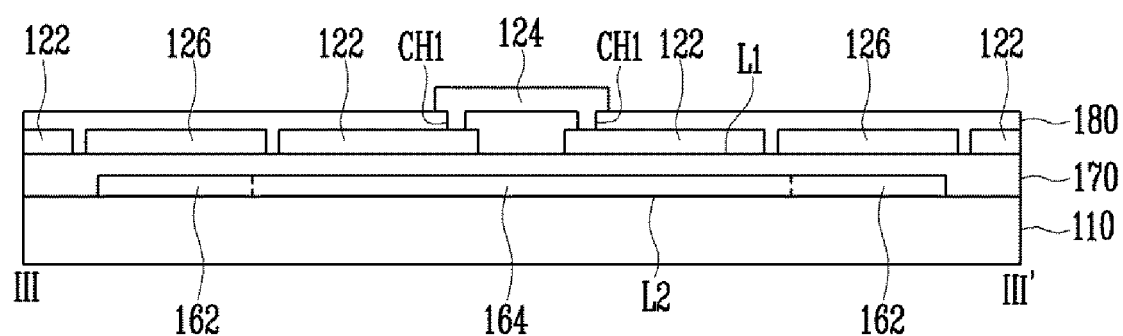
FIG. 10A is a cross-sectional view taken along line of FIG. 9 according to an exemplary embodiment.
Figure 10B:
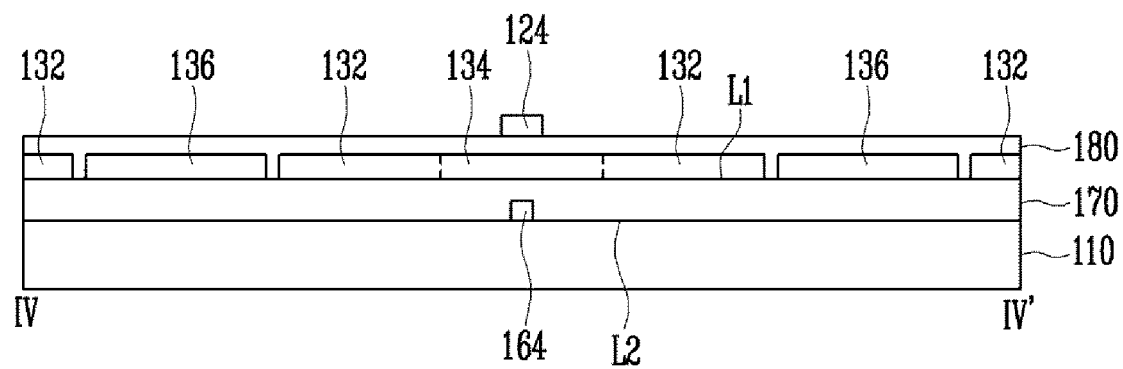
FIG. 10B is a cross-sectional view taken along line IV-IV' of FIG. 9 according to an exemplary embodiment.

FIG. 9 illustrates an exemplary embodiment relating to the sensor unit shown in FIG. 4, which shows a modification of the exemplary embodiment shown in FIG. 5. FIG. 10A shows a cross-sectional view taken along line of FIG. 9 according to an exemplary embodiment. FIG. 10B shows a cross-sectional view taken along line IV-IV' of FIG. 9 according to an exemplary embodiment. In FIGS. 9 to 10B, the same reference characters are illustrated to indicate substantially similar or identical components previously described in FIGS. 5 to 8B, and thus, repeated descriptions thereof will be omitted.

Referring to FIGS. 9 to 10B, according to an exemplary embodiment, the first connection portions 124 and the third electrode 160 may be disposed on different layers from each other. For example, the electrode portions 162 and the connection lines 164 forming the third electrode 160 may be disposed under the first plane L1, on which the first and second sensing cells 122 and 132 are disposed. For example, the third electrode 160 may be disposed between the substrate 110 and the first plane L1. In addition, the first connection portions 124 may be disposed on a third layer above the first plane L1 with a second insulating layer 180 interposed therebetween, and formed as an upper bridge. In other words, according to an exemplary embodiment, the first connection portions 124 and the third electrode 160 may be disposed on different layers while interposing the first plane L1, on which the first and second sensing cells 122 and 132 are arranged. However, the inventive concepts are not limited thereto. For example, according to another exemplary embodiment, both first connection portions 124 and third electrode 160 may be disposed above or below the first plane L1, and the first connection portions 124 and the third electrode 160 may be disposed on different layers.

When the first connection portions 124 and the third electrodes 160 (particularly, the connection lines 164) are disposed on different layers as described above, the first connection portions 124 and the connection lines 164 may overlap with each other. For example, the first connection portions 124 and the connection lines 164 may overlap with each other with at least one insulating layer (e.g., first and/or second insulating layer 170 and/or 180) interposed therebetween. However, the inventive concepts are not limited thereto. For example, according to another exemplary embodiment, when the first connection portions 124 and the third electrode 160 are disposed on different layers, the first connection portions 124 and the connection lines 164 may not overlap with each other. In other words, arrangements, shapes and/or structures of components forming the first, second, and third electrodes 120, 130, and 160 may vary.

FIGS. 11 to 14 illustrate exemplary embodiments relating to the sensor unit shown in FIG. 4, which are modifications of the embodiment shown in FIG. 5. FIGS. 5 and 11 to 14 illustrate various exemplary embodiments relating to the sensor unit shown in FIG. 4. In addition, FIG. 15A shows a cross-sectional view taken along line V-V' of FIG. 14 according to an exemplary embodiment. FIG. 15B shows a cross-sectional view taken along line VI-VI' of FIG. 14 according to an exemplary embodiment. In FIGS. 11 to 15B, the same reference characters are illustrated to indicate substantially similar or identical components previously described in FIGS. 11 to 15B, and thus, repeated descriptions thereof will be omitted.

Figure 11:
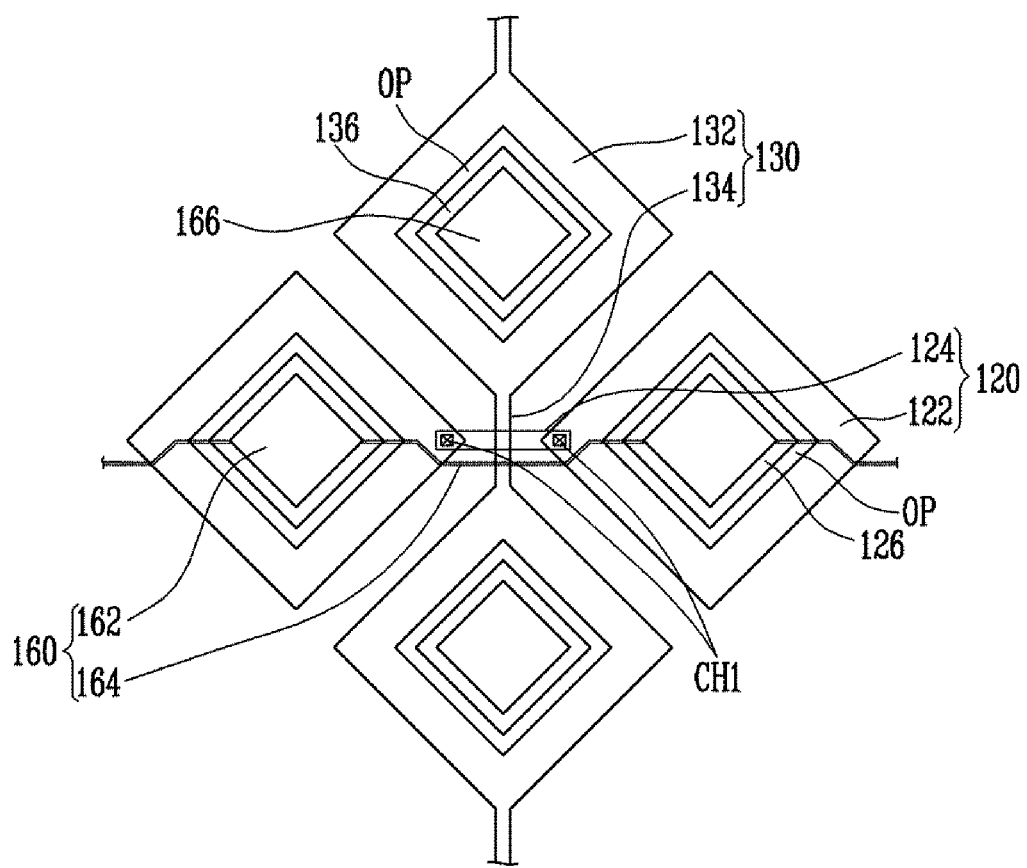
FIG. 11 is a diagram illustrating an exemplary embodiment relating to a sensor unit shown in FIG. 4.

Referring to FIG. 11, the second and third dummy patterns 136 and 166 overlapping with each other may be disposed in the openings OP of the second sensing cells 132. According to an exemplary embodiment, the second dummy patterns 136 may be patterns in the form of an island, disposed on the same layer as the second sensing cells 132, and separated from the second sensing cell 132. In addition, the third dummy pattern 166 may be disposed on the same layer as the electrode portion 162 and the connection line 164 forming the third electrode 160. For example, the third dummy pattern 166 may be disposed under the second dummy pattern 136 with at least one insulating layer (e.g., first insulating layer 170 in FIGS. 7A and 7B) interposed therebetween so as to be separated from the second dummy patterns 136.

According to an exemplary embodiment, the second dummy patterns 136 may have the same or similar shape and size as the first dummy patterns 126, and the third dummy pattern 166 may have the same or similar shape and size as the electrode portion 162. Therefore, according to the exemplary embodiment illustrated in FIG. 11, by evenly distributing patterns having a uniform pattern over the active area 101, the entire active area 101 may have more uniform visibility.

Figure 12:
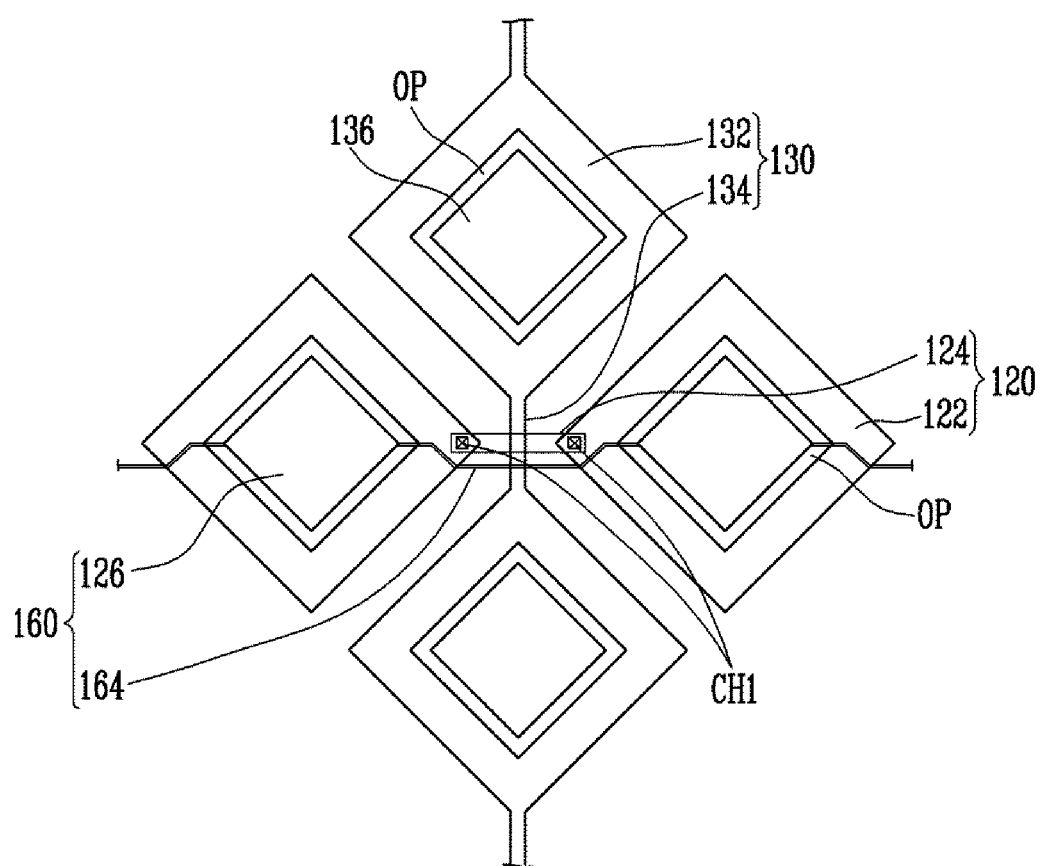
FIG. 12 is a diagram illustrating an exemplary embodiment relating to a sensor unit shown in FIG. 4.

Referring to FIG. 12, the electrode portions 162 and the third dummy patterns 166 of the second plane layer L2 as described in the above exemplary embodiments may be omitted. Instead, the first dummy patterns 126 disposed on the first plane L1, together with the first and second sensing cells 122 and 132, may be connected in the first direction through the connection lines 164. In other words, the first dummy patterns 126 and the connection lines 164 may form the third electrode 160. As described above, according to an exemplary embodiment, the first dummy patterns 126 may function as electrode portions of the third electrodes 160.

The electrode portions (e.g., first dummy patterns 126) may be disposed on the first plane L1 of the sensor unit 100 and be separated from the first sensing cells 122. The connection lines 164 may be disposed on the second plane L2 separated from the first plane L1 with at least one insulating layer, for example, the first insulating layer 170 interposed therebetween. Thus, the connection lines 164 may be electrically connected to the electrode portions through a contact hole (not illustrated) passing through the first insulating layer 170.

Figure 13:
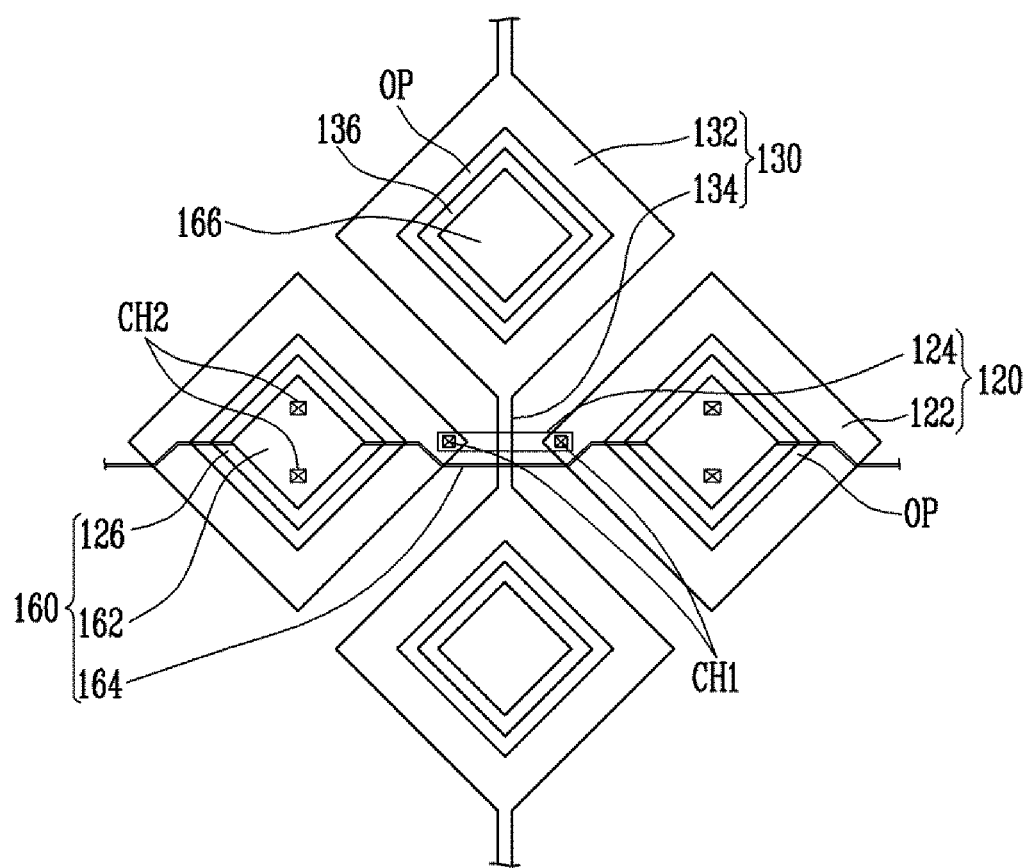
FIG. 13 is a diagram illustrating an exemplary embodiment relating to a sensor unit shown in FIG. 4.

Referring to FIG. 13, a pair of the first dummy patterns 126 and the electrode portion 162 overlapping with each other, among the first dummy patterns 126 and the electrode portions 162 overlapping with each other, may be electrically connected to each other through at least one second contact hole CH2. For example, the first dummy patterns 126 and the electrode portion 162 may be electrically connected to each other through a plurality of second contact holes CH2 passing through the first insulating layer 170 interposed therebetween. Therefore, the third electrode 160 may have a multilayer film structure. In other words, the first dummy patterns 126, the electrode portions 162, and the connection lines 164 may form the third electrodes 160.

Figure 14:
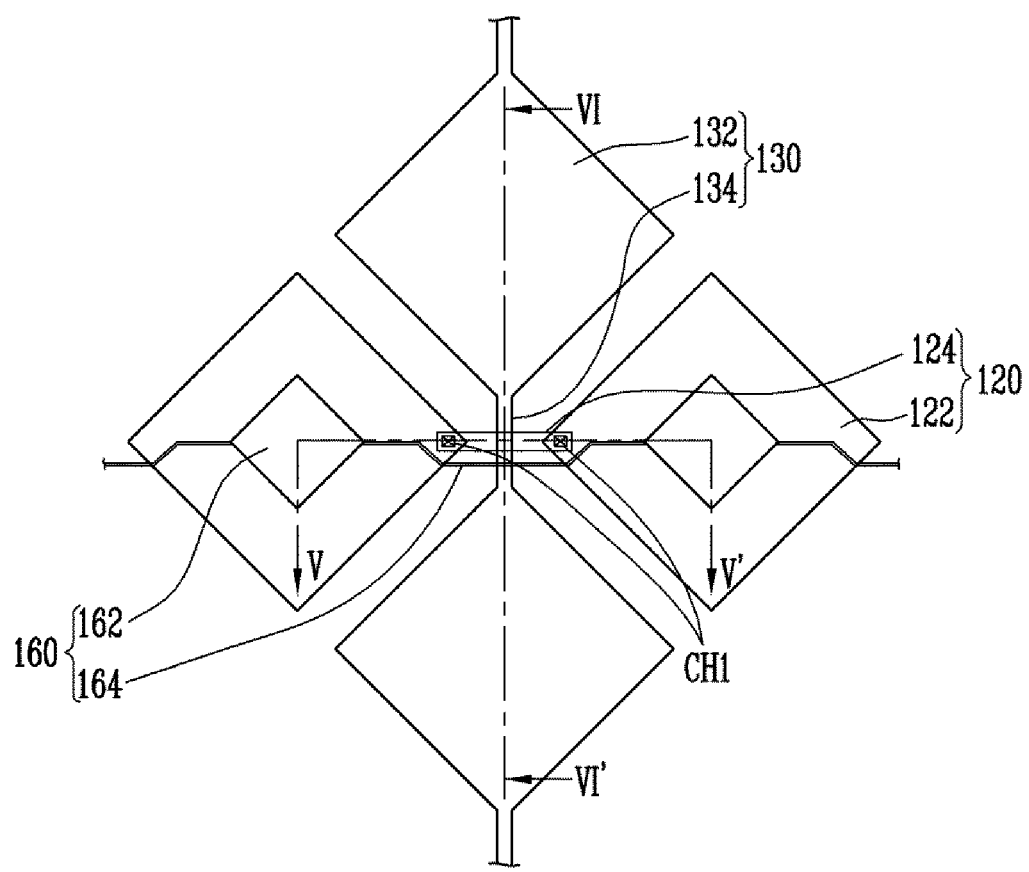
FIG. 14 is a diagram illustrating an exemplary embodiment relating to a sensor unit shown in FIG. 4.
Figure 15A:
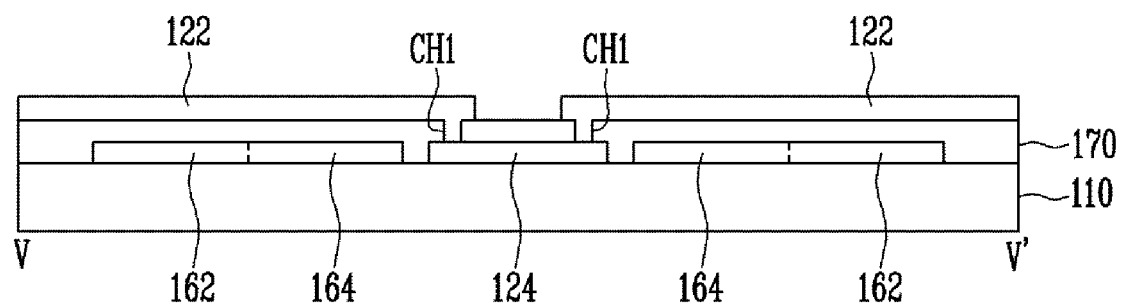
FIG. 15A is a cross-sectional view taken along line V-V' of FIG. 14 according to an exemplary embodiment.
Figure 15B:
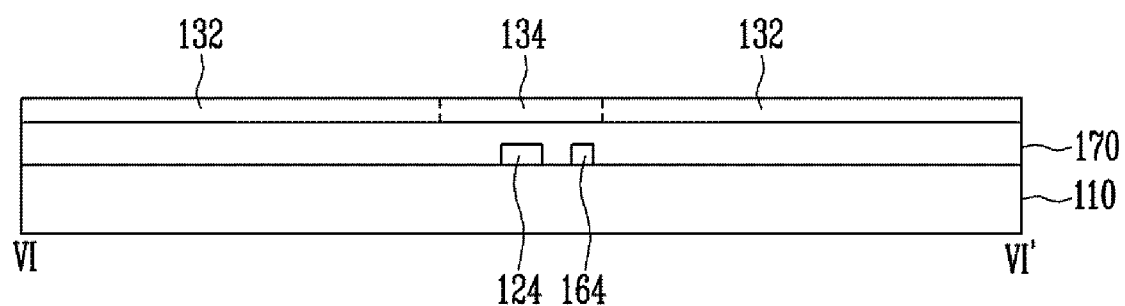
FIG. 15B is a cross-sectional view taken along line VI-VI' of FIG. 14 according to an exemplary embodiment.

Referring to FIGS. 14 to 15B, each of the first and second sensing cells 122 and 132 may not include the opening OP described in connection with the above exemplary embodiments. In addition, in the exemplary embodiment shown in FIGS. 14 to 15B, the first, second, and third dummy patterns 126, 136, and 166 may be omitted. The electrode portions 162 may be disposed in the first sensing cells 122 to overlap with portions of the first sensing cells 122, particularly, central portions thereof. The electrode portions 162 may be separated from the first sensing cells 122 while interposing at least the first insulating layer 170 therebetween as in the above exemplary embodiments. As a result, the first and third electrodes 120 and 160 may remain insulated from each other.

As in the above-described exemplary embodiments, the sensor unit 100 may include the third electrodes 160 distributed over the active area 101 in order to detect a noise signal. According to exemplary embodiments, the structure and the shape of the third electrodes 160 may vary.

Figure 16:
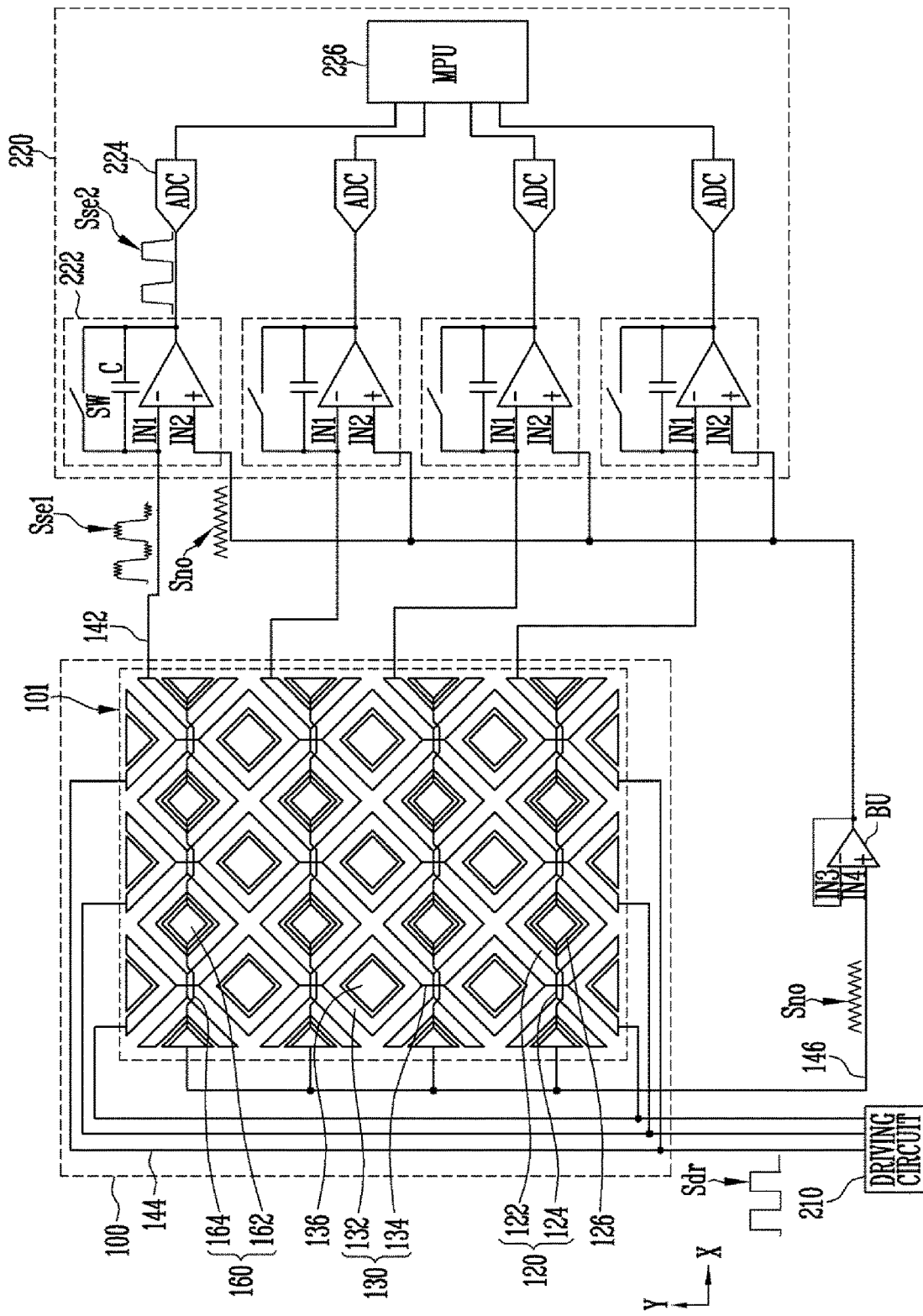
FIG. 16 is a diagram illustrating a touch sensor according to an exemplary embodiment.

FIGS. 16 and 17 each illustrate a touch sensor according to exemplary embodiments which show modifications of the embodiment shown in FIG. 4, respectively. FIGS. 4, 16 and 17 show various exemplary embodiments relating to a touch sensor. In FIGS. 16 and 17, the same reference characters are illustrated to indicate substantially similar or identical components previously described in FIG. 4, and thus, repeated descriptions thereof will be omitted.

Referring to FIG. 16, in a touch sensor according to an exemplary embodiment, the plurality of third electrodes 160 may share one third wiring line 146. The third electrodes 160 may be commonly connected to the second input terminals IN2 of the plurality of signal receivers 222 through the third wiring line 146. As illustrated in FIG. 16, the third electrodes 160 provided on the active area 101 may share one third wiring line 146. However, the inventive concepts are not limited thereto. For example, at least two of the third electrodes 160 may share one third wiring line 146.

In this manner, by connecting the plurality of third electrodes 160 to one third wiring line 146, the noise signal Sno applied to the sensor unit 100 may be detected. In addition, by providing the noise signal Sno to the plurality of signal receivers 222, common mode noise may be offset. According to an exemplary embodiment, the number of wiring lines arranged in the sensor unit 100 may be reduced. Therefore, a noise reduction structure according to the present exemplary embodiment may be usefully applicable to a narrow bezel type touch sensor.

Referring to FIG. 17, in a touch sensor according to an exemplary embodiment, the plurality of third electrodes 160 may share one third wiring line 146 as in the exemplary embodiment shown in FIG. 16. However, the touch sensor may further include a gain regulator 230 which is electrically connected to the third electrodes 160. For example, the gain regulator 230 may be electrically connected between the third wiring line 146 commonly connected to the plurality of third electrodes 160 and the signal receivers 222 receiving the noise signal Sno from the third electrodes 160. According to an exemplary embodiment, the gain regulator 230 may be provided in the touch driver 200. However, the position of the gain regulator 230 may be varied.

According to an exemplary embodiment, the gain regulator 230 may include an amplifier 232 having a gain of 1 or more, and a variable resistor 234 electrically connected to an output terminal of the amplifier 232.

According to an exemplary embodiment, a first input terminal IN5 (e.g., inverting input terminal) of the amplifier 232 may be electrically connected to the third wiring line 146 and receive the noise signal Sno from the third wiring line 146. In addition, a second input terminal IN6 (e.g., a non-inverting input terminal) of the amplifier 232 may be electrically connected to a ground (GND) power supply and receive a ground (GND) voltage. The amplifier 232 may amplify the noise signal Sno by one or more times according to a predetermined gain. For example, the amplifier 232 may include a buffer amplifier.

According to an exemplary embodiment, the variable resistor 234 may include a plurality of resistors R1 to R4 connected in series with each other. In addition, at least two signal receivers 222 provided in at least some of a plurality of receiving channels sharing the third wiring line 146 may be electrically connected to different nodes (e.g., one of Ni to N4) of the variable resistor 234. According to an exemplary embodiment, the resistors R1 to R4 connected between the respective nodes Ni to N4 may be variable resistors whose resistance values are adjustable. However, the inventive concepts are not limited thereto.

According to the above-described exemplary embodiment, the gain of the noise signal Sno input to each signal receiver 222, which receive the sensing signal Sse1 from each first electrode 120, may vary depending on the position of the first electrode 120. For example, when the magnitude of the noise signal Sno input to the sensor unit 100 gradually decreases from the first row to the last row of the active area 101, the gain of the noise signal Sno may decrease in a direction from the first signal receiver 222 in the first row receiving the sensing signal Sse1 from the first electrode 120 toward the last signal receiver 222 in the last row receiving the sensing signal Sse1 from the first electrode 120.

According to an exemplary embodiment, after the noise signal Sno is measured according to the position of the sensor unit 100, the gain (or attenuation) of the noise signal Sno applied to each signal receiver 222 may be individually controlled according to the measured magnitude of the noise signal Sno. According to this exemplary embodiment, the plurality of third electrodes 160 may be connected to one third wiring line 146 and detect the noise signal Sno of the sensor unit 100, and the gain of the noise signal Sno may be controlled to be varied depending on each channel by using the gain regulator 230. Therefore, according to the above-described exemplary embodiment, the number of wiring lines arranged in the sensor unit 100 may be reduced, and the noise signal Sno may be effectively cancelled in each receiving channel.

According to an exemplary embodiment, common mode noise introduced into a sensor unit from a display panel may be effectively cancelled. Accordingly, touch sensitivity of a touch sensor and a display device having the same may be improved, and an erroneous operation caused by a noise signal may be prevented.

Although certain exemplary embodiments and implementations have been described herein, other exemplary embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor, comprising:
   a substrate comprising an active area and a non-active area;
   a plurality of first electrodes extending in a first direction on the active area;
   a plurality of second electrodes extending in a second direction crossing the first direction on the active area;
   a plurality of third electrodes respectively comprising a plurality of electrode portions disposed on the active area to be separated from the first and second electrodes, and a plurality of connection lines connecting the plurality of electrode portions in the first direction;
   a plurality of first dummy patterns overlapping with the electrode portions; and
   a sensing circuit comprising a plurality of signal receivers receiving sensing signals from the first or second electrodes,
   wherein each of the first electrodes comprises:
   a plurality of first sensing cells arranged in the first direction, each of the first sensing cells having an opening; and
   a plurality of first connection portions connecting the first sensing cells in the first direction, wherein each of the electrode portions is disposed in the opening of each of the first sensing cells of a corresponding first electrode,
   wherein the electrode portions and the first sensing cells are disposed on a first layer, and wherein the first connection portions and the connection lines are disposed on a second layer separated from the first layer by at least one insulating layer interposed therebetween.

2. The touch sensor of claim 1, wherein:
   each of the signal receivers comprises an amplifier comprising first and second input terminals connected to a pair of first and third electrodes corresponding to each other, respectively, and outputs a signal corresponding to a voltage difference between the first and second input terminals; and
   the second input terminal is a reference terminal of the amplifier.

3. The touch sensor of claim 1, wherein
   the first connection portions and the connection lines do not overlap with each other.

4. The touch sensor of claim 3, wherein the second layer is disposed between the substrate and the first layer.

5. The touch sensor of claim 1, wherein each of the first dummy patterns is floated and has an island shape.

6. The touch sensor of claim 1, wherein one of the electrode portions and one of the first dummy patterns that overlap each other are electrically connected to each other.

7. The touch sensor of claim 1, wherein each of the second electrodes comprises:
a plurality of second sensing cells arranged in the second direction and disposed on the same layer as the first sensing cells and the electrode portions, each of the second sensing cells comprising an opening; and
a plurality of second connection portions connecting the second sensing cells in the second direction.

8. The touch sensor of claim 7, further comprising a plurality of second dummy patterns respectively disposed in the openings of the second sensing cells of a corresponding second electrode and separated from the second sensing cells.

9. The touch sensor of claim 8, wherein the second dummy patterns comprise at least one of:
third dummy patterns disposed on the same layer as the first and second sensing cells and the electrode portions; and
fourth dummy patterns disposed on a different layer from the first and second sensing cells and the electrode portions.

10. The touch sensor of claim 1, wherein the third electrodes are electrically connected to different signal receivers through different wiring lines.

11. The touch sensor of claim 1, wherein the third electrodes share one wiring line and are commonly connected to second input terminals of the signal receivers through the one wiring line.

12. The touch sensor of claim 11, further comprising a gain regulator electrically connected between the third electrodes and the signal receivers and comprising at least one variable resistor,
wherein at least two of the signal receivers are electrically connected to different nodes of the variable resistor.

13. A display device, comprising:
a display panel comprising:
a display area on which a plurality of pixels are disposed; and
a touch sensor comprising an active area overlapping the display area,
wherein:
the touch sensor comprises:
a plurality of first electrodes extending in a first direction on the active area;
a plurality of second electrodes extending in a second direction crossing the first direction on the active area;
a plurality of third electrodes respectively comprising a plurality of electrode portions disposed on the active area to be separated from the first and second electrodes;
a plurality of first dummy patterns overlapping with the electrode portions; and
a sensing circuit comprising a plurality of signal receivers receiving sensing signals from the first or second electrodes; and
each of the first electrodes comprises:
a plurality of first sensing cells arranged in the first direction, each of the first sensing cells having an opening; and
a plurality of first connection portions connecting the first sensing cells in the first direction; and
each of the electrode portions is disposed in the opening of each of the first sensing cells of a corresponding first electrode, such that a circumference of each of the electrode portions is entirely surrounded by the corresponding first sensing cell in a plan view.

14. The display device of claim 13, wherein each of the third electrodes comprises:
the plurality of electrode portions arranged in the first direction; and
a plurality of connection lines connecting the plurality of electrode portions in the first direction.

15. The display device of claim 13, wherein:
the third electrodes share one wiring line and are commonly connected to second input terminals of the signal receivers through the one wiring line; and
the touch sensor further comprises a gain regulator electrically connected between the third electrodes and the signal receivers.

16. The display device of claim 13, wherein:
each of the signal receivers comprises an amplifier comprising first and second input terminals connected to a pair of first and third electrodes corresponding to each other, respectively, and outputs a signal corresponding to a voltage difference between the first and second input terminals; and
the second input terminal is a reference terminal of the amplifier.

17. The display device of claim 13, wherein each of the second electrodes comprises:
a plurality of second sensing cells arranged in the second direction and disposed on the same layer as the first sensing cells and the electrode portions; and
a plurality of second connection portions connecting the second sensing cells in the second direction.

18. The display device of claim 17, wherein:
each of the second sensing cells comprises an opening; and
the touch sensor further comprises a plurality of second dummy patterns disposed in the openings of the second sensing cells of a corresponding second electrode to be separated from the second sensing cells, the second dummy patterns disposed on the same layer as the first and second sensing cells and the electrode portions.

19. A touch sensor, comprising:
a substrate comprising an active area and a non-active area;
a plurality of first electrodes extending in a first direction on the active area;
a plurality of second electrodes extending in a second direction crossing the first direction on the active area;
a plurality of third electrodes respectively comprising a plurality of electrode portions disposed on the active area to be separated from the first and second electrodes and a plurality of connection lines connecting the plurality of electrode portions in the first direction;
a plurality of first dummy patterns overlapping with the electrode portions; and
a sensing circuit comprising a plurality of signal receivers receiving sensing signals from the first or second electrodes,
wherein each of the first electrodes comprises:
a plurality of first sensing cells arranged in the first direction, each of the first sensing cells having an opening; and
a plurality of first connection portions connecting the first sensing cells in the first direction, wherein each of the electrode portions is disposed in the opening of each of the first sensing cells of a corresponding first electrode, and wherein the plurality of first electrodes, the plurality of second electrodes, and the plurality of electrode portions are disposed on the same plane and do not overlap each other in a plan view.

* * * * *